United States Patent
Harada et al.

(10) Patent No.: US 12,069,665 B2
(45) Date of Patent: Aug. 20, 2024

(54) USER TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Jing Wang, Tokyo (JP); Liu Liu, Beijing (CN); Huiling Jiang, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 564 days.

(21) Appl. No.: 16/331,636

(22) PCT Filed: Sep. 7, 2017

(86) PCT No.: PCT/JP2017/032187
§ 371 (c)(1),
(2) Date: Mar. 8, 2019

(87) PCT Pub. No.: WO2018/047885
PCT Pub. Date: Mar. 15, 2018

(65) Prior Publication Data
US 2019/0364557 A1 Nov. 28, 2019

(30) Foreign Application Priority Data
Sep. 9, 2016 (JP) .................................. 2016-176857

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0055* (2013.01); *H04W 72/0446* (2013.01); *H04W 72/1268* (2013.01); *H04W 72/23* (2023.01)

(58) Field of Classification Search
None
See application file for complete search history.

(56) References Cited

U.S. PATENT DOCUMENTS 9,184,896 B2 * 11/2015 Oizumi ............. H04W 72/1289
9,215,050 B2 * 12/2015 Seo ........................ H04L 1/1685
(Continued)

FOREIGN PATENT DOCUMENTS

WO      2016/114938 A1    7/2016
WO      WO2017/069798   *   4/2017 ........... H04L 1/1657

OTHER PUBLICATIONS

Extended European Search Report issued in the counterpart European Patent Application No. 17848823.5, mailed Apr. 2, 2020 (6 pages).
(Continued)

*Primary Examiner* — Gregory B Sefcheck
(74) *Attorney, Agent, or Firm* — Osha Bergman Watanabe & Burton LLP

(57) ABSTRACT

The present invention is designed so that uplink control information such as delivery acknowledgment signals can be transmitted properly, even when UL/DL configurations are changed, in a communication system that is configured to use listening. According to one aspect of the present invention, a user terminal has a receiving section that receives downlink control information and downlink data, a transmission section that transmits a delivery acknowledgment signal in response to the downlink data, and a control section that controls transmission of the delivery acknowledgment signal based on a result of UL listening which is executed before transmission of the delivery acknowledgment signal, and based on information that is contained in the downlink control information and/or timing that is configured in advance on a per DL burst basis.

5 Claims, 21 Drawing Sheets

(51) Int. Cl.
*H04W 72/0446* (2023.01)
*H04W 72/1268* (2023.01)
*H04W 72/23* (2023.01)

(56) References Cited

U.S. PATENT DOCUMENTS

| | | | | |
|---|---|---|---|---|
| 9,485,060 | B2* | 11/2016 | Nayeb Nazar | H04L 1/0073 |
| 9,515,802 | B2* | 12/2016 | Seo | H04L 1/1861 |
| 9,578,633 | B2* | 2/2017 | Seo | H04L 1/1685 |
| 9,681,326 | B2* | 6/2017 | He | H04L 5/0073 |
| 9,723,603 | B2* | 8/2017 | Takeda | H04L 5/0091 |
| 9,877,309 | B2* | 1/2018 | Seo | H04L 1/0026 |
| 9,961,673 | B2* | 5/2018 | Wei | H04L 1/1858 |
| 10,063,352 | B2* | 8/2018 | Liu | H04L 1/1893 |
| 10,110,365 | B2* | 10/2018 | Yang | H04W 72/042 |
| 10,305,668 | B2* | 5/2019 | Yang | H04L 5/0053 |
| 10,341,057 | B2* | 7/2019 | Shen | H04L 5/0055 |
| 10,405,307 | B2* | 9/2019 | Nguyen | H04L 5/0051 |
| 10,461,895 | B2* | 10/2019 | Rosa | H04L 1/1812 |
| 10,523,397 | B2* | 12/2019 | Park | H04L 5/0055 |
| 10,601,567 | B2* | 3/2020 | Marinier | H04W 52/0216 |
| 10,630,410 | B2* | 4/2020 | Parkvall | H04L 5/1469 |
| 10,708,000 | B2* | 7/2020 | He | H04L 1/1692 |
| 10,798,685 | B2* | 10/2020 | Chen | H04L 5/001 |
| 10,931,425 | B2* | 2/2021 | He | H04L 1/1671 |
| 2012/0236812 | A1* | 9/2012 | Chen | H04W 52/54 370/329 |
| 2013/0039305 | A1* | 2/2013 | Kishiyama | H04W 72/1263 370/329 |
| 2013/0208690 | A1* | 8/2013 | Nishikawa | H04W 72/0446 370/329 |
| 2013/0308593 | A1* | 11/2013 | Takeda | H04W 72/042 370/329 |
| 2013/0343313 | A1* | 12/2013 | Takeda | H04L 1/0028 370/329 |
| 2014/0226608 | A1* | 8/2014 | Seo | H04L 5/0055 370/329 |
| 2014/0293893 | A1* | 10/2014 | Papasakellariou | H04L 5/0055 370/329 |
| 2014/0328260 | A1* | 11/2014 | Papasakellariou | H04L 1/1887 370/329 |
| 2015/0071196 | A1* | 3/2015 | Park | H04W 72/0413 370/329 |
| 2015/0163773 | A1* | 6/2015 | Wang | H04L 1/0003 370/329 |
| 2016/0205679 | A1 | 7/2016 | Yoo et al. | |
| 2016/0249337 | A1* | 8/2016 | Liang | H04W 72/0406 |
| 2016/0286558 | A1* | 9/2016 | Chae | H04W 72/0413 |
| 2016/0295597 | A1* | 10/2016 | Franz | H04B 7/0695 |
| 2017/0230165 | A1* | 8/2017 | Yang | H04W 76/14 |
| 2017/0280448 | A1* | 9/2017 | Takeda | H04W 16/14 |
| 2017/0359806 | A1* | 12/2017 | Takeda | H04W 72/12 |
| 2017/0374658 | A1* | 12/2017 | Kim | H04W 72/12 |
| 2018/0159675 | A1* | 6/2018 | Yang | H04L 5/001 |
| 2018/0242321 | A1* | 8/2018 | Takeda | H04L 1/1858 |

OTHER PUBLICATIONS

International Search Report issued for PCT/JP2017/032187, mailed Nov. 28, 2017 (5 pages).
Written Opinion issued for PCT/JP2017/032187, mailed Nov. 28, 2017 (4 pages).
3GPP TS 36.300 V12.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12); Dec. 2014 (251 pages).
Ericsson; "PUCCH Design for Enhanced LAA"; 3GPP TSG-RAN WG1#84 R1-160998; St Julian's, Malta, Feb. 15-19, 2016 (4 pages).
Huawei, HiSilicon; "UCI transmission for eLAA"; 3GPP TSG RAN WG1 Meeting #85 R1-164076; Nanjing, China, May 23-27, 2016 (6 pages).
Notice of Reasons for Refusal issued in Japanese Application No. 2018-538452 mailed on Sep. 14, 2021 (10 pages).
LG Electronics, "PUCCH design in LAA", 3GPP TSG RAN WG1 metting #84bis, R1-162469, Busan, Korea, Apr. 11-15, 2016 (5 pages).
Office Action issued in European Application No. 17848823.5 mailed on Nov. 23, 2021 (6 pages).
Nokia Networks, Alcatel-Lucent, Alcatel-Lucent Shanghai Bell, "Timing Relationships for NB-IoT", 3GPP TSG-RAN WG1 Meeting #84, R1-160463, St Julian's, Malta, Feb. 15-19, 2016 (6 pages).
Huawei, HiSilicon, "Discussion on timing relations for NR frame structure" 3GPP TSG RAN WG1 Meeting #86, R1-166105, Gothenburg, Sweden, Aug. 22-26, 2016 (4 pages).
Office Action in counterpart Chinese Patent Application No. 201780065565.X issued on Feb. 18, 2022 (12 pages).
Office Action in counterpart Chinese Patent Application No. 201780065565.X issued on Jul. 18, 2022 (14 pages).
Office Action issued in counterpart Chinese Patent Application No. 201780065565.X mailed on Jan. 28, 2023 (16 pages).
Office Action issued in counterpart Chinese Patent Application No. 201780065565.X mailed on Aug. 18, 2023 (17 pages).
Office Action issued in counterpart European Patent Application No. 17848823.5 mailed on Oct. 13, 2023 (4 pages).
Office Action in counterpart Chinese Patent Application No. 201780065565.X issued on Jan. 2, 2024 (13 pages).

\* cited by examiner

FIG. 4A

| BIT | p |
|---|---|
| 000 | 0 |
| 001 | 1 |
| 010 | 2 |
| 011 | 3 |
| 100 | 4 |
| 101 | 5 |
| 110 | 6 |
| 111 | 7 |

FIG. 4B

| BIT | p' |
|---|---|
| 000 | 4 |
| 001 | 5 |
| 010 | 6 |
| 011 | 7 |
| 100 | 8 |
| 101 | 9 |
| 110 | 10 |
| 111 | 11 |

TYPE A-1

TYPE A-2

← 1 SYMBOL →

TYPE A-3

↑ 25us

TYPE A-4

↑ 25us+TA

TYPE A-5

← 1 SYMBOL →

TYPE A-6

← 1 SYMBOL →     ← 1 SYMBOL →

TYPE A-7

↑ 25us     ← 1 SYMBOL →

TYPE A-8

↑ 25us+TA     ← 1 SYMBOL →

FIG. 14A

| BIT | START TIMING |
|---|---|
| 00 | SYMBOL #0 |
| 01 | 25 μs FROM SYMBOL #0 |
| 10 | 25 μs +TA FROM SYMBOL #0 |
| 11 | SYMBOL #1 |

FIG. 14B

| BIT | END TIMING |
|---|---|
| 0 | SYMBOL #12 |
| 1 | SYMBOL #13 |

FIG. 14C

| BIT | PUCCH SUBFRAME TYPE A | PUCCH SUBFRAME TYPE B |
|---|---|---|
| 00 | A-1 | B-1 |
| 01 | A-2 | B-2 |
| 10 | A-3 | B-3 |
| 11 | A-4 | - |

| BIT | REPORT SET |
|-----|------------|
| 00  | 1          |
| 01  | 2          |
| 10  | 3          |
| 11  | 4          |

SET 1
· INTERLACE INDEX 1
· CDM INDEX 2 (CYCLIC SHIFT=1 AND/OR OCC INDEX=1)

SET 2
· INTERLACE INDEX 2
· CDM INDEX 2 (CYCLIC SHIFT=2 AND/OR OCC INDEX=2)

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Furthermore, the specifications of LTE-advanced (Rel. 10 to 12) have been drafted for the purpose of achieving further broadbandization and higher speeds beyond LTE, and, in addition, for example, a successor system of LTE—referred to as "5G (5th generation mobile communication system)"—is under study.

The specifications of LTE of Rel. 8 to 12 have been drafted on assumption that exclusive operations are carried out in frequency bands that are licensed to communications providers (operators) (also referred to as "licensed CCs" (or "licensed bands")). As licensed CCs, for example, 800 MHz, 1.7 GHz and 2 GHz are used.

In recent years, user traffic has been increasing steeply following the spread of high-performance user terminals (UE (User Equipment)) such as smart-phones and tablets. Although more frequency bands need to be added to accommodate this increasing user traffic, licensed CCs have limited spectra (licensed spectra).

Consequently, a study is in progress with Rel. 13 LTE to enhance the frequencies of LTE systems by using bands of unlicensed spectra (also referred to as "unlicensed CCs" (or "unlicensed bands")) that are available for use apart from licensed CCs (see non-patent literature 2). For unlicensed CCs, for example, the 2.4 GHz band and the 5 GHz band, where Wi-Fi (registered trademark) and Bluetooth (registered trademark) can be used, are under study for use.

To be more specific, Rel. 13 LTE is presently under study to apply carrier aggregation (CA) between licensed CCs and unlicensed CCs. In this way, communication that is performed by using unlicensed CCs together with licensed CCs is referred to as "LAA (License-Assisted Access)." Note that, in the future, dual connectivity (DC) between licensed CCs and unlicensed CCs and stand-alone (SA) of unlicensed CCs may become the subject of study under LAA. Furthermore, it is likely that radio communication methods to use unlicensed bands (or listening) will be introduced in future radio communication system, including 5G, 5G+ (plus), NR (New RAT), LTE Rel. 14 or later versions, and so forth.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

Non-Patent Literature 2: AT&T, Drivers, Benefits and Challenges for LTE in Unlicensed Spectrum, 3GPP TSG-RAN Meeting #62 RP-131701

SUMMARY OF INVENTION

Technical Problem

For unlicensed CCs, a study is in progress to introduce interference control functions in order to allow co-presence with other operators' LTE, Wi-Fi and/or other systems. In Wi-Fi, LBT (Listen Before Talk), which is based on CCA (Clear Channel Assessment), is used as an interference control function for use in the same frequency.

Consequently, there is an agreement to control DL transmission by applying "listening" (for example, LBT) as an interference control function, even when unlicensed CCs are configured in LTE systems. Meanwhile, even for UL transmission (for example, transmission of an uplink control channel), studies are on-going to control transmission based on listening results as in DL transmission. Listening that is performed prior to transmission is also referred to as "channel access procedure."

Furthermore, for LAA, research is underway on controlling the UL/DL communicating direction in each subframe by changing the communicating direction based on scheduling and/or other conditions (without configuring UL/DL configurations on a fixed basis). The problem in this case lies in how to control the transmission of delivery acknowledgment signals when a user terminal sends feedback of delivery acknowledgment signals (also referred to as "HARQ-ACK," "ACK/NACK," "A/N," etc.) in response to DL transmission, in an uplink control channel.

The present invention has been made in view of the above, and it is therefore an object of the present invention to provide a user terminal and a radio communication method, whereby uplink control information such as delivery acknowledgment signals can be transmitted properly, even when UL/DL configurations are changed, in a communication system that uses cells designed to use listening.

Solution to Problem

According to one aspect of the present invention, a user terminal has a receiving section that receives downlink control information and downlink data, a transmission section that transmits a delivery acknowledgment signal in response to the downlink data, and a control section that controls transmission of the delivery acknowledgment signal based on a result of UL listening which is executed before transmission of the delivery acknowledgment signal, and based on information that is contained in the downlink control information and/or timing that is configured in advance on a per DL burst basis.

Advantageous Effects of Invention

According to the present invention, uplink control information such as delivery acknowledgment signals can be transmitted properly, even when UL/DL configurations are changed, in a communication system that uses cells designed to use listening.

BRIEF DESCRIPTION OF DRAWINGS

FIGS. 4A and 4B are diagrams to show examples of tables in which offsets to indicate feedback timings are set forth;

FIGS. 14A to 14C are diagrams to show examples of tables for use for reporting PUCCH configurations;

FIG. 15 is a diagram to show an example of a table for use for reporting interlaced indices and/or CDM indices;

DESCRIPTION OF EMBODIMENTS

Figure 1:
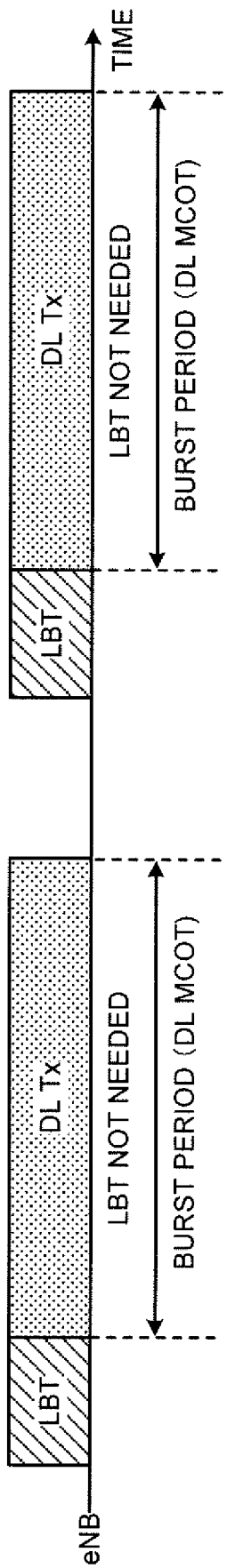
FIG. 1 is a diagram to show an example of a communication method using channel access procedures.

In systems that run LTE/LTE-A in unlicensed CCs (for example, LAA systems), interference control functionality is likely to be necessary in order to allow co-presence with other operators' LTE, Wi-Fi and/or other systems. In this case, efficient and fair co-presence with other systems and other operators is required. Note that systems that run LTE/LTE-A in unlicensed CCs may be collectively referred to as "LAA," "LAA-LTE," "LTE-U," "U-LTE" and so on, regardless of whether the mode of operation is CA, DC or SA.

Generally speaking, when a transmission point (for example, a radio base station (eNB), a user terminal (UE) and so on) that communicates by using a carrier (which may also be referred to as a "carrier frequency," or simply a "frequency") of an unlicensed CC detects another entity (for example, another user terminal) that is communicating using this unlicensed CC's carrier, the transmission point is disallowed to make transmission in this carrier.

Therefore, the transmission point performs "listening (LBT (Listen Before Talk))" at a timing a predetermined period before a transmission timing. To be more specific, by executing LBT, the transmission point searches the whole of the target carrier band (for example, one component carrier (CC)) at a timing that is a predetermined period before a transmission timing, and checks whether or not there are other pieces of apparatus (for example, radio base stations, user terminals, Wi-Fi apparatus and so on) communicating in this carrier band.

Note that "listening" refers to the operation which a given transmission point (for example, a radio base station, a user terminal and so on) performs before transmitting signals so as to detect/measure whether or not signals to exceed a predetermined level (for example, predetermined power) are being transmitted from other transmission points. Furthermore, listening that is performed by radio base stations and/or user terminals may be referred to as "channel access procedures," "LBT," "CCA (Clear Channel Assessment)," "carrier sensing" and so on.

The transmission point then carries out transmission using this carrier only if it is confirmed that no other apparatus is communicating. For example, if the received power measured during LBT (the received signal power during listening period) is equal to or lower than a predetermined threshold, the transmission point judges that the channel is in the idle state ($LBT_{idle}$), and carries out transmission. When a "channel is in the idle state," this means that, in other words, the channel is not occupied by a specific system, and it is equally possible to say that a channel is "idle," a channel is "clear," a channel is "free," and so on.

On the other hand, if only just a portion of the target carrier band is detected to be used by another piece of apparatus, the transmission point stops its transmission. For example, if the transmission point detects that the received power of a signal from another piece of apparatus in this band exceeds a predetermined threshold, the transmission point judges the channel is in the busy state ($LBT_{busy}$), and makes no transmission. In the event $LBT_{busy}$ is yielded, LBT is carried out again with respect to this channel, and the channel becomes available for use only after the idle state is confirmed. Note that the method of judging whether a channel is in the idle state/busy state based on LBT is by no means limited to this.

FIG. 1 shows example of communication methods using channel access procedures.

In the event of DL communication, when the result of listening (DL-LBT) performed by a radio base station before DL transmission is "LBT-idle," a period, in which DL transmission to skip LBT (DL burst transmission) is allowed, can be configured (FIG. 1). The period during which transmission is allowed without performing LBT after listening (in the event of LBT-idle) is also referred to as "DL maximum channel occupancy time (DL MCOT)," "channel occupancy time," "burst period" ("burst transmission period," "burst length," "maximum burst length," "maximum possible burst length," etc.) and so on. Also in the event of UL communication, it is possible to control the execution of LBT.

As described above, by introducing interference control that is based on LBT mechanism in LAA systems, it becomes possible to prevent interference between LAA and Wi-Fi, interference between LAA systems and so on. Furthermore, even when transmission points are controlled independently per operator that runs an LAA system, LBT makes it possible to reduce interference without learning the details of each operator's control.

Meanwhile, when the mechanism of LBT is introduced in LAA systems, fair co-presence with other systems (for example, Wi-Fi) and other LTE operators are required. For the purpose of ensuring fair co-presence with other systems and other operators, it may be possible to apply random backoff to listening even when LTE/LTE-A systems are used in unlicensed CCs. Random backoff refers to the mechanism by which, even when a channel enters the idle state, each transmission point does not start transmission immediately, but defers transmission for a randomly configured period of time (counter value), and starts transmission when the channel is clear.

For example, if a channel is in a busy state in an unlicensed CC, each transmission point (access point) starts transmitting data when the channel is judged to be in the idle state by means of listening. In this case, if multiple transmission points waiting for the channel to enter the idle state start transmitting simultaneously, there is a high possibility that collisions will occur between the transmission points. Therefore, for the purpose of preventing collisions between transmission points, even when the channel enters the idle state, each transmission point does not transmit immediately and defers transmission for a randomly configured period, thereby reducing the possibility of collisions between the transmission points (random backoff).

Such an LBT mechanism with random backoff is also referred to as "category 4." Meanwhile, the LBT mechanism without random backoff is also referred to as "category 2." Category 2 is an LBT mechanism that permits transmission immediately after a predetermined period of time (also referred to as "defer duration (D_eCCA)") passes, and is also referred to as "25 μs LET" because 25 μs is prescribed in LAA as an example of the predetermined time.

Now, studies are in progress to transmit uplink control information in an uplink control channel (for example, PUCCH) in a carrier of an unlicensed CC (hereinafter also referred to as an "unlicensed carrier"). In existing systems (or licensed carriers), it is stipulated that uplink control information in response to DL transmission, such as HARQ-ACKs and/or others, is transmitted in the PUCCH in a UL subframe that is located a certain period, which is configured on a fixed basis, after the DL subframe.

Meanwhile, for LAA, research is underway on controlling the UL/DL communicating direction in each subframe by changing the communicating direction based on scheduling conditions, listening results and so on (without configuring UL/DL configurations on a fixed basis). For example, when a channel is idle due to DL listening, a radio base station might transmit downlink control information and/or downlink data. In addition, the radio base station can command a user terminal to transmit UL data by including a UL transmission command (UL grant) in downlink control information.

Figure 2:
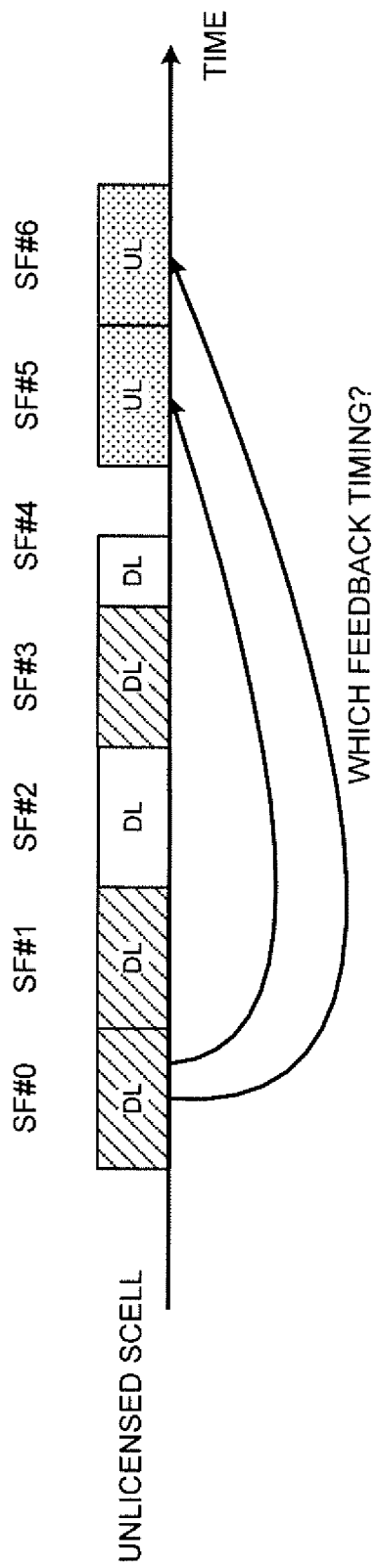
FIG. 2 is a diagram to show an example of A/N transmission in an unlicensed SCell.

However, if a user terminal sends uplink control information such as HARQ-ACKs as feedback to DL data by using an uplink control channel, the problem lies in how to control the transmission of the uplink control channel (for example, transmission timing) when UL/DL configurations are not fixed (see FIG. 2). In the case shown in FIG. 2, DL subframes are configured from SF #0 to SF #4, and UL subframes are configured in SF #5 and SF #6. Referring to FIG. 2, the question is at which timing (in which UL subframe) the user terminal should transmit HARQ-ACKs in response to the DL data scheduled in predetermined DL subframes (here, SF #0, SF #1 and SF #3) is the problem.

For example, as in UL data transmission, it may be possible to control the timing for sending HARQ-ACK feedback (PUCCH transmission) based on UL grants transmitted from the radio base station. However, in this case, when DL data is transmitted, it is also necessary to transmit a UL grant apart from downlink control information for scheduling this DL data's transmission, so that overhead might increase. Therefore, there is a demand for a method for controlling PUCCH transmission (transmission timing, etc.) without using UL grants.

The present inventors have focused on using downlink control information to schedule DL data (also referred to as "DL assignment," "DL grant," for example) and/or controlling the transmission of uplink control information for each DL burst that is configured in transmission following listening. So, the present inventors have come up with the idea of controlling the transmission of delivery acknowledgment signals and so forth based on information contained in downlink control information (for example, timing information, DL burst, UL burst information, etc.), and/or based on timings that are configured on a per DL burst basis. By this means, even when UL/DL configurations are changed, it is still possible to appropriately control the transmission of uplink control information such as delivery acknowledgment signals.

Also, the present inventors have focused on the fact that, when an HARQ-ACK is transmitted, how to determine the transmission size (also referred to as "codebook size") of this HARQ-ACK is likely to pose a problem. So, the present inventors have come up with the ideas of controlling codebook size based on the feedback window size that is configured in the subframe in which the HARQ-ACK is transmitted, and/or based on DAIs contained in downlink control information.

Now, embodiments of the present invention will be described below in detail with reference to the accompanying drawings. Each embodiment below will be described on assumption that UE executes UL LBT in unlicensed CCs, but this is by no means limiting. In addition, in the following description, designs that replace a licensed carrier (CC) with a carrier in which listening (LBT) is not configured (and which may be referred to as a "carrier in which listening is not executed/cannot be executed," a "non-listening carrier," etc.), and replace an unlicensed carrier (CC) with a carrier in which listening (LBT) is configured (and which may be referred to as a "carrier in which listening is executed/must be executed," a "listening carrier," etc.) also constitute embodiments of the present invention.

First Example

Now, with a first example of the present invention, the timing for transmitting uplink control information (for example, HARQ-ACKs) in an unlicensed carrier (for example, SCell), and an example of the method of controlling the codebook size of HARQ-ACKs will be described.
<Transmission Timing>

A user terminal controls the transmission of HARQ-ACKs in response to DL data that is received in an unlicensed carrier based on information related to transmission timing, which is contained in downlink control information (DL grant) that schedules this DL data (and this information will be hereinafter referred to as "transmission timing information"). To be more specific, the user terminal selects the subframe for transmitting HARQ-ACKs based on transmission timing information that is provided in a bit field (X bits) in a DL grant, and transmits HARQ-ACKs by using an uplink control channel (PUCCH) in this subframe.

Figure 3:
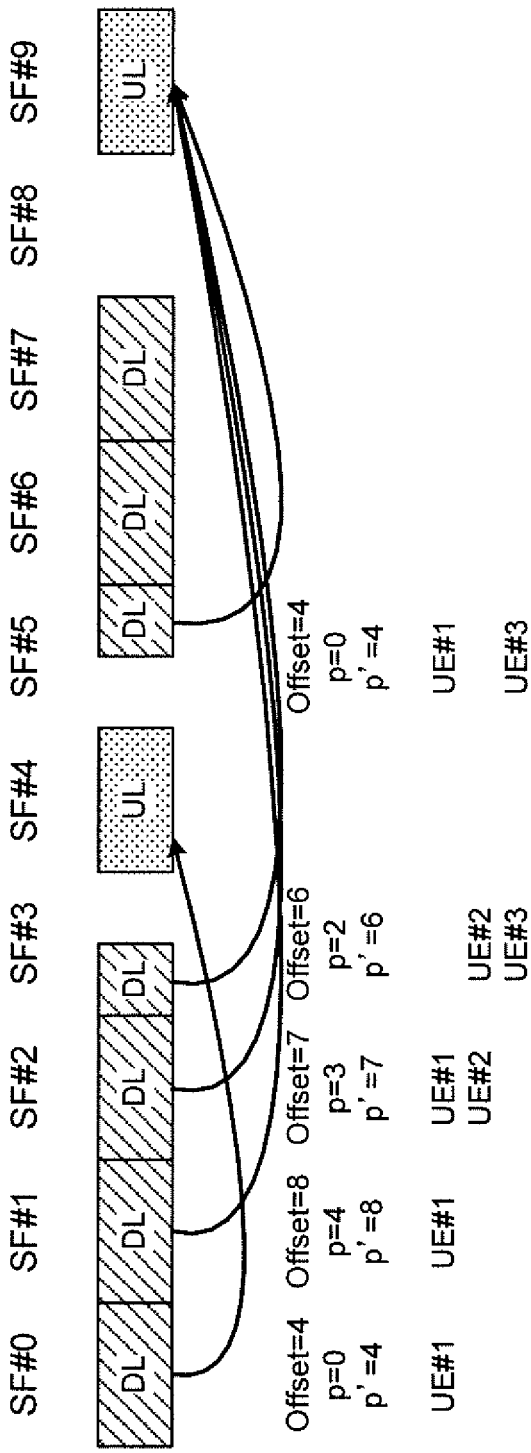
FIG. 3 is a diagram to show examples of A/N transmission according to the present embodiment.

FIG. 3 shows an example of the method of transmitting HARQ-ACKs in an unlicensed carrier. In this case, DL data is transmitted (for example, DL subframes are configured) in SFs #0 to #3 and SFs #5 to #7, and uplink control channels are transmitted (for example, UL subframes are configured) in SFs #4 and #9. In addition, FIG. 3 shows a case where DL data transmission for a first user terminal (UE #1) is scheduled in SFs #0 to #2 and SF #5, DL data transmission for a second user terminal (UE #2) is scheduled in SFs #2 and #3, and DL data transmission for a third user terminal (UE #3) is scheduled in SFs #3 and #5.

Based on transmission timing information (p or p') contained in the downlink control information (DL grant) transmitted in SF #0, UE #1 transmits an HARQ-ACK in response to the DL data transmitted in SF #0, in SF #4. In addition, UE #1 transmits HARQ-ACKs in response to the DL data transmitted in SFs #1, #2 and #5, in SF #9, based on transmission timing information contained in the downlink control information transmitted respectively in SFs #1, #2 and #5.

Likewise, UE #2 transmits HARQ-ACKs in response to the DL data transmitted in SFs #2 and #3, in SF #9, based on transmission timing information contained in the downlink control information transmitted in SFs #2 and #3. UE #3 transmits HARQ-ACKs in response to the DL data transmitted in SFs #3 and #5, in SF #9, based on transmission timing information contained in the downlink control information transmitted in SFs #3 and #5.

Between a subframe in which a DL grant is received and the subframe in which feedback is sent, a period of a minimal timing gap (for example, Y ms) may be provided. Information related to the minimum timing gap (Y) for use in HARQ-ACK transmission may be defined in advance in the specification, on a fixed basis, or may be configured from the radio base station to user terminals via higher layer signaling, for example.

Information (p) to represent an addition to the minimum timing gap (Y) may be reported to user terminals as timing information, by using X bits (see FIG. 4A). In this case, the offset from receipt of a DL grant to transmission of an HARQ-ACK is represented by Y+p. Alternatively, information (p') to represent the timing gap (offset) itself between a DL grant and the HARQ-ACK feedback subframe may be reported to user terminals directly (see FIG. 4B). In this case, the offset from receipt of a DL grant to transmission of an HARQ-ACK can be represented by p'.

For example, referring to FIG. 3, when Y is configured to 4, downlink control information (DL grant) that is transmitted to UE #1 in SF #0 can include p=0 or p'=4 as transmission timing information. In this way, timing information can be included in DL grants and reported to user terminals, so that the transmission of HARQ-ACKs can be controlled properly even when UL/DL configurations are changed.

Note that, although FIG. 4 shows a case of configuring X to three bits, the number of bits to be configured as X is not limited to three. The bits to use to report offsets can also be configured (the number of bits of X is variable) by using higher layer signaling and so on.

In addition, a user terminal may report, in advance, information about the minimum feedback delay and/or the maximum feedback delay that can be tolerated in HARQ-ACK feedback, to the network (for example, a radio base station) as its capability information (capability).

As for the structure of UL subframes which the user terminal might use to send HARQ-ACK feedback (also referred to as "PUCCH configuration," "PUCCH subframe structure," "subframe type," etc.), for example, a specific PUCCH subframe structure may be selected from among a plurality of PUCCH subframe structures and configured. Information about this particular PUCCH subframe structure may be defined in the specification in advance, or may be reported from a radio base station to user terminal via higher layer signaling and/or in downlink control information.

For PUCCH subframe structures, subframe structures that do not include DL communication (subframe type A) and/or subframe structures that include DL communication in part (subframe type B) can be configured. Subframe structures to include DL communication (UL communication) in part are also referred to as "partial DL subframes," "partial UL subframes" and the like.

Figure 5:
FIG. 5 is a diagram to show examples of PUCCH subframe types.
Figure 5:
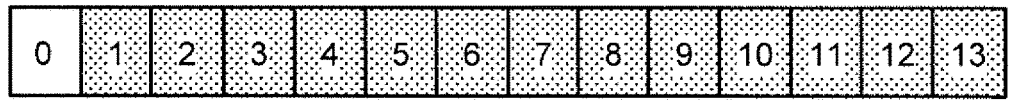
Figure 5:
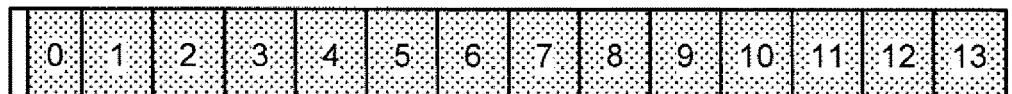
Figure 5:
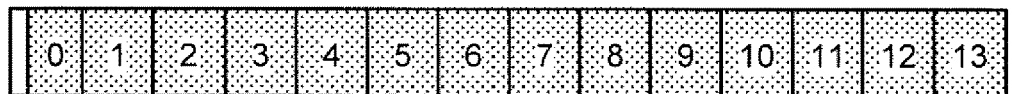
Figure 5:
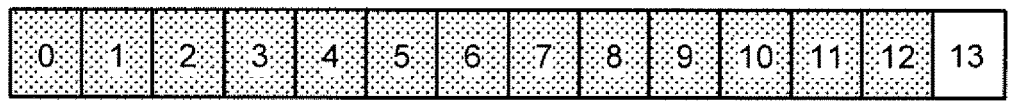
Figure 5:
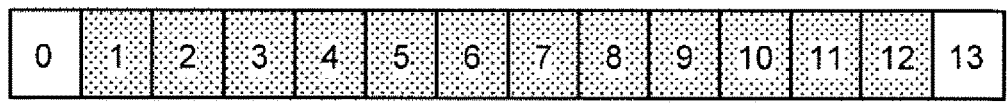
Figure 5:
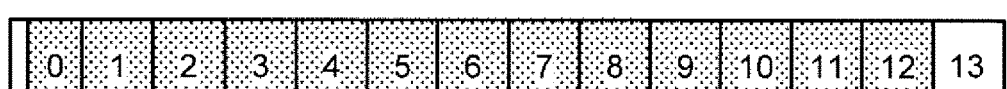
Figure 5:
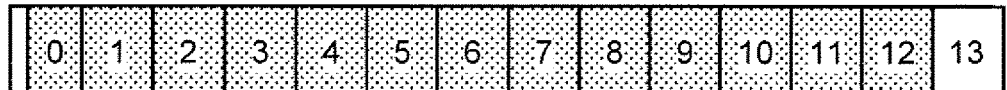

To transmit PUCCH based on subframe type A, which does not include DL communication, it may be possible to combine and configure, for example, a structure in which PUCCH transmission starts from the beginning of a subframe (for example, from the top symbol), a structure in which PUCCH transmission does not start from the beginning of a subframe, a structure in which PUCCH transmission ends in the last symbol of a subframe, and a structure in which PUCCH transmission ends in a symbol that is located immediately before the last symbol of a subframe (see FIG. 5) and so forth. Structures in which PUCCH transmission does not start from the beginning of a subframe may be configured so that UL transmission starts after a predetermined period (for example after 25 μs, after 1 symbol, or after 25 μs+TA, etc.) is over (type A-4, A-8, etc.). Note that, although FIG. 5 exemplifies types A-1 to A-8, the PUCCH configurations that are applicable to the present embodiment are by no means limited to these.

Figure 6:
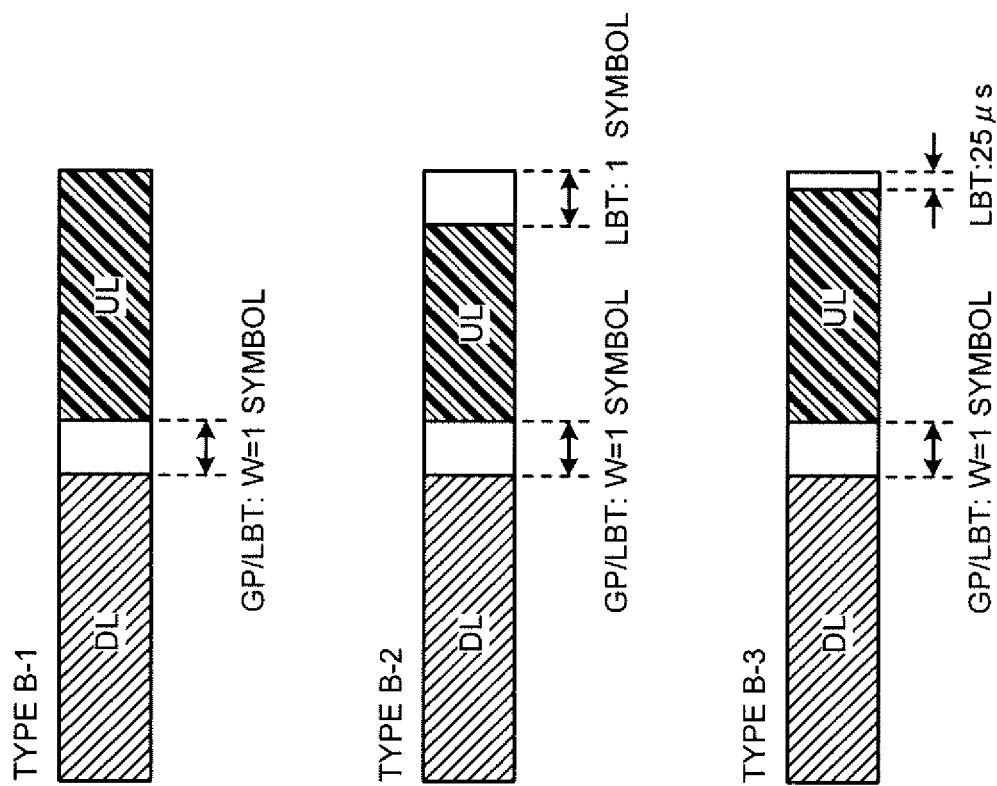
FIG. 6 is a diagram to show other examples of PUCCH subframe types.

To transmit PUCCH based on subframe type B, which includes DL communication in part, it may be possible to combine and configure, for example, a structure in which PUCCH transmission starts a predetermined period (W) after the last DL symbol in a subframe, a structure in which PUCCH transmission ends in the last symbol of a subframe, a structure in which PUCCH transmission ends immediately before the last symbol of a subframe or a predetermined period (25 μs) before the last symbol, and so forth (see FIG. 6). FIG. 6 exemplifies types B-1 to B-3, but the PUCCH configurations that are applicable to the present embodiment are by no means limited to these.

In type-B subframe structures, the number of symbols of DL parts may be configured to one of 3, 6, 9, 10, 11 and 12, and this number of DL symbols and W can be reported to user terminals. W is the blank period that is provided between the last DL symbol and UL transmission (for example, PUCCH transmission). Once the number of DL symbols and W are determined, a user terminal can specify the number of UL symbols to use for PUCCH.

Also, if the number of symbols of DL parts is a specific value (for example, a predetermined value or more), the user terminal may be configured not to support PUCCH transmission based on type-B PUCCH configurations. This is because, if the number of symbols of DL parts is configured to be large (for example, twelve symbols), the number of UL symbols that can be used to transmit HARQ-ACKs becomes smaller, and appropriate allocation may not be possible in some cases.

<Feedback Window>

When transmitting uplink control information such as HARQ-ACKs and so forth in a certain UL subframe, a user terminal transmits HARQ-ACKs in response to one or more DL subframes. In this case, the user terminal determines the range of DL subframes (feedback window) to cover in HARQ-ACK transmission in a predetermined UL subframe based on predetermined conditions. Depending on what feedback window is configured for feedback transmission in each UL subframe, the user terminal can control the timing for transmitting an HARQ-ACK in response to each DL subframe as feedback. Note that UL subframes here include partial subframes that include UL transmission, or include partial subframes not including DL transmission.

A feedback window can, for example, make the first DL subframe to command feedback its starting point. The first DL subframe to command feedback may refer to the DL subframe that is located at the top in the time direction among DL subframes where HARQ-ACK transmission is controlled using a certain UL subframe. For example, when transmission timing information (for example p or p') is contained in a DL grant transmitted in a DL subframe, the user terminal can assume that the DL subframe having the largest p or p' in a predetermined range is the first subframe.

Also, the feedback window can make the subframe that is located a predetermined value before a UL subframe, in which HARQ-ACK feedback is sent, its end point. This predetermined value may be a minimal timing gap (Y) that is configured between a DL subframe and the subframe in which feedback is sent. In this case, the size of the feedback window can be p+1 or p'+1−Y.

Figure 7:
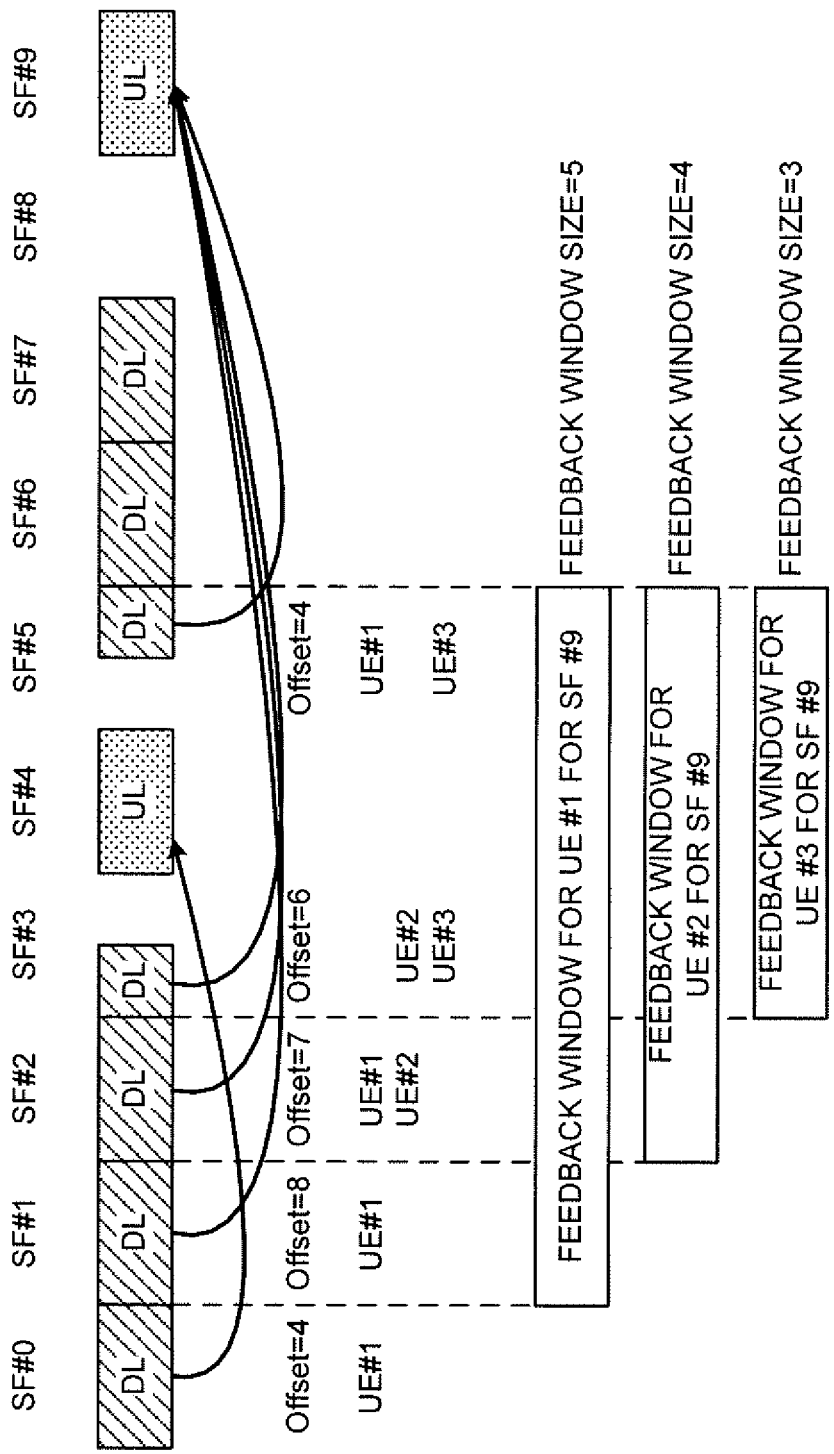
FIG. 7 is a diagram to show examples of feedback windows according to the present embodiment.

FIG. 7 shows an example of the method of configuring feedback windows. In the method shown in FIG. 7, when DL data is allocated to UE #1 to #3 as in FIG. 3, a feedback window is configured in a predetermined UL subframe (here SF #9). Note that, although a case is shown here where Y=4, but the value of Y is not limited to this.

Based on transmission timing information contained in each downlink control information transmitted in SFs #1, #2 and #5, UE #1 transmits HARQ-ACKs in response to the DL data transmitted in SFs #1, #2 and #5, in SF #9. In his case, the feedback window starts with SF #1, which is the first DL subframe to command feedback in SF #9, and ends with SF #5, which is located Y (4 ms) before SF #9. Therefore, the window size when UE #1 sends feedback in SF #9 is 5.

Based on transmission timing information that is contained in the downlink control information transmitted in SFs #2 and #3, UE #2 transmits HARQ-ACKs in response to the DL data transmitted in SFs #2 and #3, in SF #9. In this case, the feedback window starts with SF #2, which is the first DL subframe to command feedback in SF #9, and ends with SF #5, which is located Y (4 ms) before SF #9. Consequently, the window size when UE #2 sends feedback in SF #9 is 4.

Based on transmission timing information that is contained in the downlink control information transmitted in SFs #3 and #5, UE #3 transmits HARQ-ACKs in response to the DL data transmitted in SFs #3 and #5, in SF #9. In this case, the feedback window starts with SF #3, which is the first DL subframe to command feedback in SF #9, and ends with SF #5, which is located Y (4 ms) before SF #9. Therefore, the window size when UE #3 sends feedback in response to SF #9 is 3.

In this way, the user terminal can determine the range and size of the feedback window when a DL subframe (DL grant) to command feedback in each UL subframe is detected. Note that the radio base station may report information about the range and/or size of feedback windows to user terminals by using downlink control information (for example, DL grants) and so on. By this means, even when a user terminal fails to detect a signal (for example, a DL grant) that is transmitted in a DL subframe to be a feedback window's starting position, the user terminal can learn the feedback window size and so forth accurately.

<HARQ-ACK Codebook Size>

The user terminal controls the transmission of HARQ-ACKs in a predetermined codebook size (also referred to as "CB size," "A/N codebook size," "bit sequence," "bit size," and the like). As for the method of determining the codebook size, any one of following (1) to (3) can be used. Note that, in the following description, cases will be described in which the transport block (TB) and the number of component carriers configured in a user terminal are both one.

(1) Using Feedback Window Size

The user terminal can determine the codebook size based on the feedback window size (S). In this case, the user terminal makes the codebook size the largest possible size (the size corresponding to the case where all the subframes in the feedback window are allocated).

For example, referring to FIG. 7, UE #1 determines the codebook size of HARQ-ACK feedback in SF #9 based on the feedback window size (here, 5). Note that, if the TB size and/or the number of CCs is greater than one, UE #1 determines the codebook size by also taking into account the TB size and/or the number of CCs. For example, in the event one CC is configured and two TBs are configured for UE #1, the codebook size of HARQ-ACK feedback in SF #9 can be set to 10 (=5×2).

The radio base station may report information about the feedback window size to the user terminal. By this means, even if the user terminal fails to detect the DL signal (for example, a DL grant) that is transmitted in the DL subframe be a feedback window's starting location, the user terminal can still determine the codebook size properly. In this case, the radio base station can include information about the feedback window size in downlink control information (for example, a DL grant) that is transmitted to the user terminal, and report this to the user terminal.

(2) Using Feedback Window Size and the Number of Non-DL Subframes

The user terminal may determine the codebook size based on the feedback window size and the number of non-DL subframes. To be more specific, the user terminal can determine the codebook size based on the value (S−q), which is given by subtracting the number of non-DL subframes (q) from the feedback window size (S).

The radio base station reports information about the number of DL subframes to the user terminal. For example, the radio base station reports the number of non-DL subframes to the user terminal by using common DCI, which is transmitted in each subframe in a DL burst. In this case, the radio base station may report, to the user terminal, for example, the number of UL subframes after the DL burst, as the number of non-DL subframes. Also, the radio base station may report information about the feedback window size to the user terminal.

For example, in FIG. 7, UE #1 determines the codebook size of HARQ-ACK feedback in SF #9 to 4 based on the feedback window size (here, 5) and the number of non-DL subframes (here, 1). In this case, the number of UL subframes (here, 1) after a DL burst (SFs #0 to #3) may be reported from the radio base station to the user terminal.

In this way, instead of using the maximum possible size (feedback window size), the user terminal can determine the codebook size by taking into account the number of subframes in which DL transmission actually takes place in the feedback window. Thus, it is possible to prevent the overhead related to codebook size from increasing.

(3) Using DAIS

The user terminal may determine the codebook size based on DL assignment indices (DAIs (Downlink Assignment Indicators (Indices))). The DAI is a value assigned to each scheduled subframe, and used to identify scheduled subframes.

For example, when DL data is scheduled in subframes, DAIS that correspond to these subframes respectively are configured in each subframe's downlink control information and transmitted. DAIS to be included in each subframe's downlink control information can be configured in ascending order based on, for example, subframe numbers.

In the event DL signals are received in a plurality of subframes, and, if the values of DAIs (cumulative values and/or count values) contained in the downlink control information of each subframe are not continuous, the user terminal can determine the subframes corresponding to the DAIs that could not be detected have failed to be detected. In this way, by using DAIs, it is possible to allow the radio base station and the user terminal to share a common understanding of HARQ-ACK codebook size, so that, even when the user terminal fails to detect a subframe, adequate retransmission control can be made on the radio base station side.

However, even when DAIS are used, if the subframe in which the DAI contained in the downlink control information is the largest, among the scheduled subframes, fails to be detected, the user terminal cannot recognize this failed detection. Therefore, it is effective if the radio base station includes information about the number of scheduled subframes (total number) in downlink control information and reports this to the user terminal. That is, it is preferable if the radio base station includes information to indicate the number of scheduling subframes, in the downlink control information of each subframe, in addition to information for use for counting scheduling subframes, and reports these to the user terminal. Note that the information that is used to count scheduling subframes is referred to as "counter DAIs," and the information to indicate the number of scheduling subframes is referred to as "total DAIs."

According to the present embodiment, the radio base station configures DL DAIs (counter DAIs and/or total DAIs), in the feedback window of each UL subframe, based on the scheduling of each user terminal, and reports these DAIs to each user terminal. Note that the radio base station may be configured to report counter DAIs alone, or report total DAIs alone.

Based on the values of DL DAIs contained in received (detected) downlink control information (for example, DL grants) and the amount of downlink control information actually detected, the user terminal can judge whether or not there has been failed reception. Also, the user terminal can determine codebook size based on DL DAIs (counter DAIs and/or total DAIs) provided in the feedback window.

For example, referring to FIG. 7, in the feedback window (SFs #1 to #5) of UE #1 corresponding to SF #9, the radio base station includes different counter DAIs (here, 1, 2 and 3) in the downlink control information of SFs #1, #2 and #5, scheduled for UE #1. Also, in addition to the counter DAIs, the radio base station includes a total DAI (here, 3), which indicates the total number of scheduling subframes, in the downlink control information of SFs #1, #2 and #5. The user terminal can determine that the codebook size is 3 based on the maximum value of counter DAIs (here, 3) and/or the total DAI (here, 3).

In this way, the user terminal can determine the codebook size based on the number of SFs that are actually scheduled in the feedback window, not based on the number of all DL subframes included in the feedback window. As a result of this, it is possible to prevent the overhead related to codebook size from increasing.

Note that the user terminal can also determine the above codebook size by taking into account the TB size and the number of CCs configured. For example, when one TB is scheduled, the number of A/N bits in one subframe is one, and, when two TBs are scheduled, the number of A/N bits in one subframe is two. However, when two TBs are scheduled, the number of A/N bits per TB may be set to one by using bundling. Also, when multiple CCs (for example, SCells) are configured in a user terminal, the number of A/N bits is configured to cover all of the scheduled SCells.

Although cases have been described with the above description in which information (offset) that relates to one transmission timing is included in downlink control information transmitted in each SF, the present embodiment is by no means limited to this. It is also possible to include information that relates to a number of transmission timings, in downlink control information, and report this to a user terminal. This can increase the opportunities to transmit HARQ-ACKs.

For example, referring to FIG. 7, two pieces of information, each related to a timing (offset) for sending HARQ-ACK feedback in response to the DL data transmitted in SF #0, are included in the downlink control information (for example, a DL grant) of this SF #0. These two pieces of timing information include, for example, the offset from SF #0 to SF #4 (p=1 or p'=4) and the offset from SF #0 to SF #9 (p=5 or p'=9).

The user terminal can transmit a delivery acknowledgment signal (HARQ-ACK) in response to the DL data of SF #0 in SF #4, and in SF #9. That is, the user terminal transmits the delivery acknowledgment signal of the same content in both SF #4 and #9. This provides increased opportunities for transmitting delivery acknowledgment signals, so that, even if the LBT that is executed before SF #4 is transmitted yields "busy," as long as the LBT that is executed before SF #9 is transmitted yields "idle," a delivery acknowledgment signal in response to SF #0 can be transmitted in SF #9.

When information that relates to a number of transmission timings is included in downlink control information, the user terminal can determine the codebook size by using one of methods (1) to (3). Note that, when the codebook size determining method of above (3) is used, it is preferable to make the number of DL DAIs to configure and the number of offsets to include in downlink control information the same (two, in this case). For example, the radio base station includes the DL DAI in the feedback window corresponding to SF #4 and the DL DAI in the feedback window corresponding to SF #9, in downlink control information, and reports these to the user terminal. By this means, it is possible to configure appropriate codebook size for HARQ-ACKs transmitted at each offset.

Second Example

With a second example of the present invention, the timing for transmitting uplink control information in an unlicensed carrier, and an example of the method of controlling HARQ-ACK codebook size that is different from the above first example will be described below. Note that the following description will primarily focus on differences from the first example, and configurations that are not described can be the same as in the above-described first example.

<Transmission Timing>

According to the second example, in an unlicensed carrier, a user terminal controls the process of transmitting uplink control information such as HARQ-ACKs (including determining the timing for transmission, size, and so forth) on a per DL burst basis (in DL burst units). In this case, the user terminal receives information about DL bursts from the radio base station. Also, the user terminal receives information about UL bursts (or non-DL transmission) following DL bursts from the radio base station.

The radio base station can include information related to DL bursts and/or information related to UL bursts in common L1 signaling and report this to user terminals. Common L1 signaling can be transmitted by using downlink control information (for example, DCI format 1C) in each DL subframe. The information related to DL bursts and/or UL bursts can be reported to user terminals by using common L1 signaling, and therefore does not have to be reported to every individual user terminal.

Information about a DL bust may be, for example, information that shows the length of a DL burst (for example, the number of subframes included in the DL burst), information that shows offsets (DL burst end offsets) to the last DL subframe where a DL burst ends (or the first UL (non-DL transmission) subframe following a DL burst), and so forth.

Information about a UL burst may be, for example, information that shows the length of a UL burst (or the length of non-DL transmission) that is configured after a DL burst. Also, the radio base station may report information for identifying DL bursts (for example, DL burst indices) to user terminals.

Figure 8:
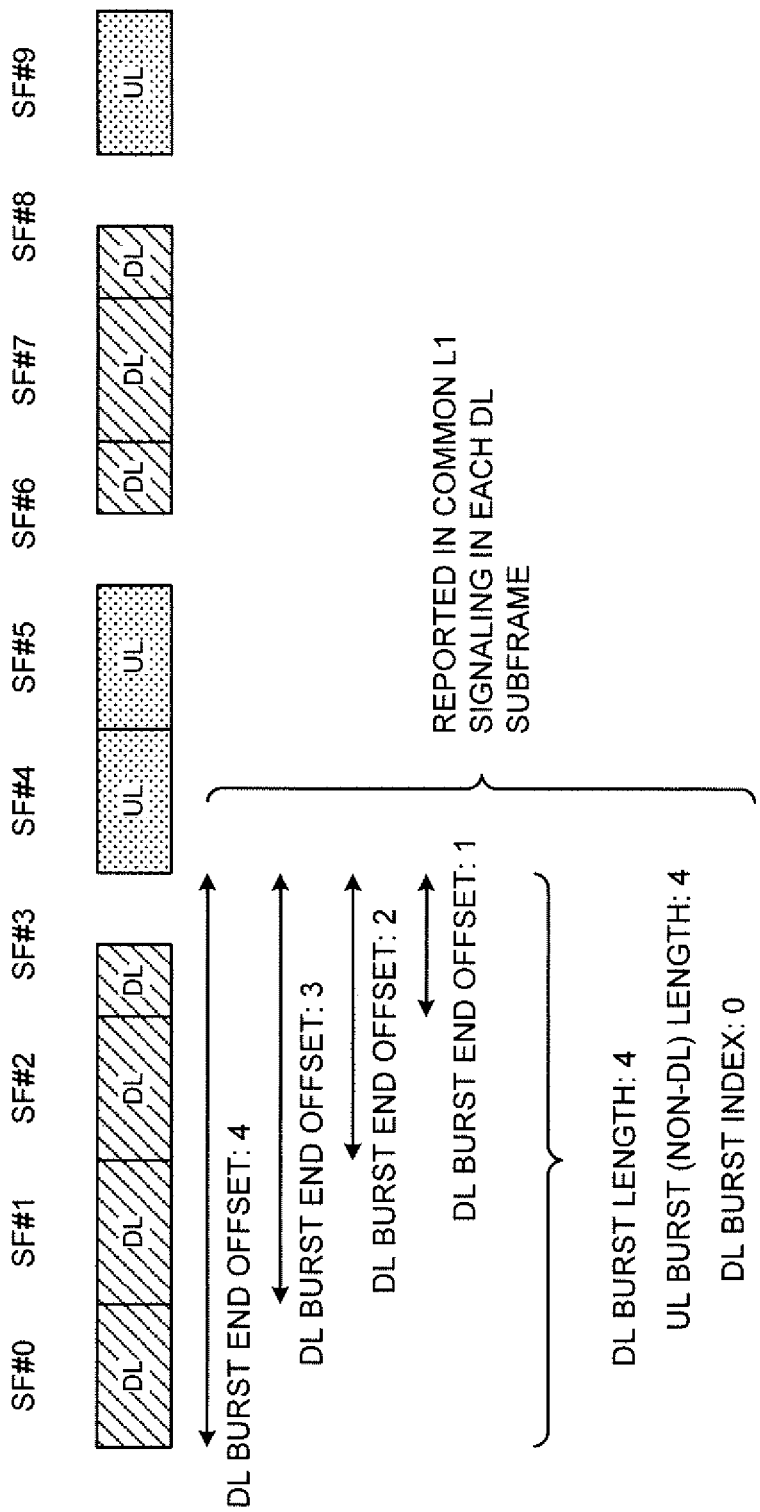
FIG. 8 is a diagram to show another example of A/N transmission according to the present embodiment.

FIG. 8 shows a case where DL burst transmission and UL burst transmission (or non-DL transmission) are configured. In FIG. 8, SF #0 to SF #3 constitute the first DL burst (DL burst index #1), SF #4 and SF #5 constitute the first UL burst, SF #6 to SF #8 constitute a second DL burst (DL burst index #2), and SF #9 constitutes a second UL burst.

The downlink control information (for example, common L1 signaling) in each DL subframe constituting the first DL burst includes at least one of the length of the DL burst, an offset relative to the end of the DL burst, and the length of a UL burst. Also, a DL burst index may be included in the downlink control information. The DL burst length and the UL berth length have the same values in the downlink control information of each DL subframe, and the offset to the end of the DL burst assumes different values in the downlink control information of each DL subframe.

The timing for sending HARQ-ACKs as feedback in response to a predetermined DL burst can be configured in one subframe (for example, a UL subframe). The timing for sending HARQ-ACK feedback in response to each DL burst may be defined in the specification in advance, or may be reported to user terminals by using downlink control information and so on.

To determine in advance the timing for sending HARQ-ACK feedback in response to a DL burst, the type of the PUCCH subframe structure (subframe type) for sending HARQ-ACK feedback may be configured in advance. As for the subframe type, the structures shown in FIGS. 5 and 6 may be used, or other structures may be used.

Figure 9:
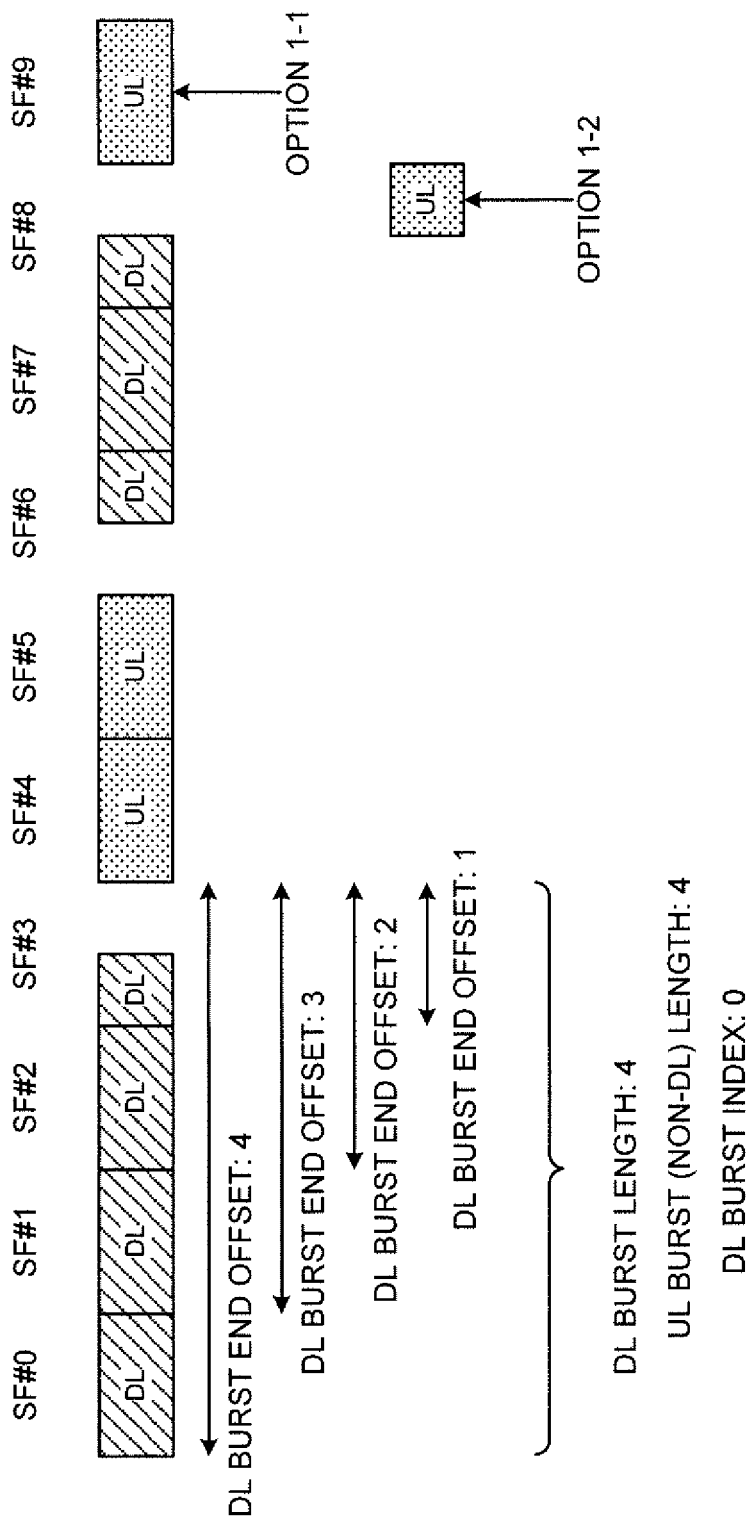
FIG. 9 is a diagram to show another example of A/N transmission according to the present embodiment.

For example, in the event subframe type A is used, the timing of the subframe for sending HARQ-ACK feedback may be the first subframe that is designed in subframe type A and that is located at least a predetermined period (for example, Y ms) after a DL burst (option 1-1 in FIG. 9). In this case, many resources in the subframe can be used for UL transmission.

In the event subframe type B is used, the timing of the subframe for sending HARQ-ACK feedback may be the first subframe that is designed in subframe type B and that is located at least a predetermined period (for example, Y ms) after the DL burst (option 1-2 in FIG. 9). In this case, HARQ-ACK feedback can be sent by using the earliest UL transmission (partial DL subframe) located a predetermined period after the DL burst.

When the timing for sending HARQ-ACKs in response to a DL burst as feedback is designated by downlink control information, transmission timing information (offset) to designate the feedback subframe is included in the downlink control information and transmitted to user terminals. As for the downlink control information, user terminal-common control information (UE-common DCI) and/or user terminal-specific control information (UE-specific DCI) can be used.

Figure 10:
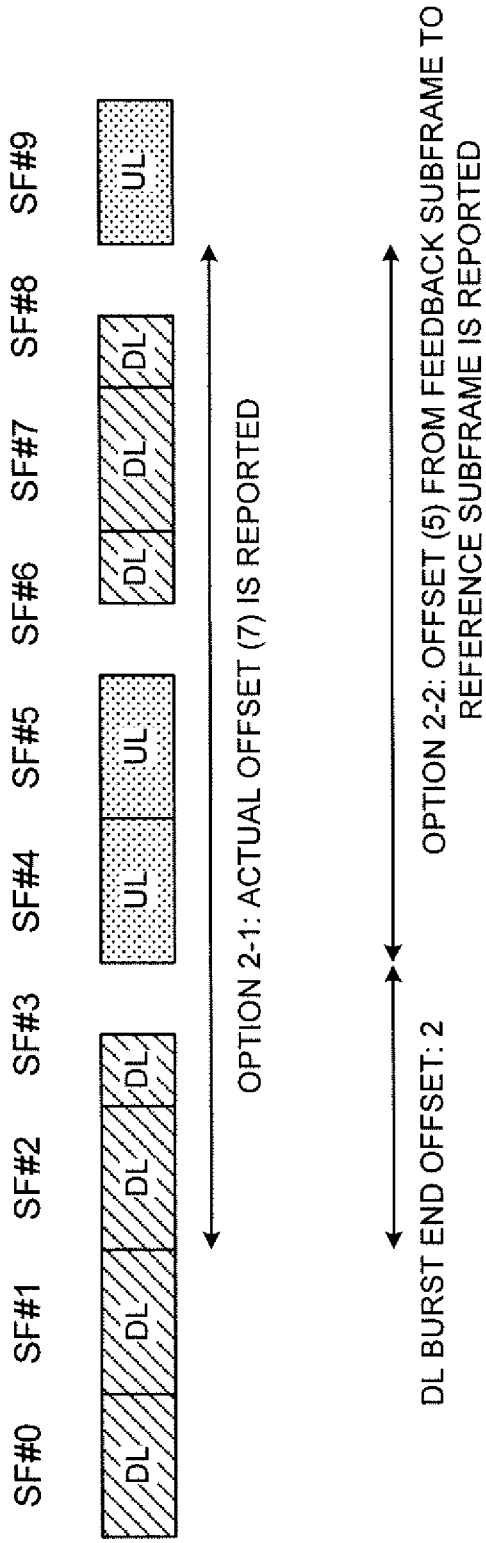
FIG. 10 is a diagram to show another example of A/N transmission according to the present embodiment.

As for the offset to the feedback subframe, for example, the offset between each DL subframe in which downlink control information is transmitted, and the feedback subframe can be reported (option 2-1 of FIG. 10). Alternatively, a feedback timing based on a predetermined reference subframe (the offset between a given reference subframe and the feedback subframe) may be reported as an offset to the feedback subframe (option 2-2 in FIG. 10). For example, the last DL subframe in a DL burst can be used as the predetermined reference subframe.

<Feedback Window>

Feedback window size can be configured in association with DL bursts. That is, a user terminal can assume that the feedback window size and the DL burst length are the same.

<HARQ-ACK Codebook Size>

A user terminal controls transmission of HARQ-ACKs in predetermined codebook size (also referred to as "CB size," "A/N codebook size," "bit sequence," "bit size," etc.). As for the method of determining codebook size, the DL burst length and/or DAIs can be used.

For example, when transmitting HARQ-ACKs in a predetermined UL subframe, the user terminal determines the codebook size according to the DL burst length (feedback window size) corresponding to this UL subframe.

Alternatively, the user terminal may determine the codebook size based on DAIs. In this case, the radio base station configures DL DAIs (counter DAIs and/or total DAN) within a DL burst (in DL burst units) and reports these DL DAIs to the user terminal by using downlink control information that is transmitted in the DL burst.

Based on the values of DL DAIS contained in received (detected) downlink control information (for example, DL grants) and the amount of downlink control information actually detected in the DL burst, the user terminal can judge whether or not there has been failed reception. Also, the user terminal can determine the codebook size based on DAIs (counter DAIs and/or total DAIs) in the DL burst.

In this way, by controlling the transmission timing and/or the codebook size of uplink control information such as HARQ-ACKs on a per DL burst basis, it is possible to control the transmission of uplink control information such as HARQ-ACKs delivery acknowledgment signals appropriately, even when UL/DL configurations are changed.

(Variations)

Although a case has been shown above with FIG. 8 where DL subframes are configured throughout the DL burst period (also referred to as "DL MCOT") that is configured per DL burst, this is by no means limiting. For example, in a given DL burst period (DL MCOT), a UL burst can be configured after DL transmission (DL burst). In this case, the radio base station can include information about a UL burst (also referred to as "UL burst information," "UL burst configuration information") in a DL signal transmitted in the DL burst, and report this to a user terminal.

For example, the radio base station includes information about a UL burst, in user terminal-common control information (for example, common PDCCH) that is transmitted in the DL burst, and reports this to the user terminal. The information about a UL burst may be at least one of the length of a UL burst, the timing at which the UL burst starts and/or ends, and the conditions of listening that is executed before the UL burst.

The user terminal may transmit HARQ-ACKs in response to DL data transmitted in a DL burst by using a UL burst that is configured following the DL burst period. For example, the user terminal transmits HARQ-ACKs in response to DL subframes scheduled in a DL burst by using a UL subframe in the first UL burst located at least a predetermined period later (for example, Y ms later) (see FIG. 11).

Figure 11:
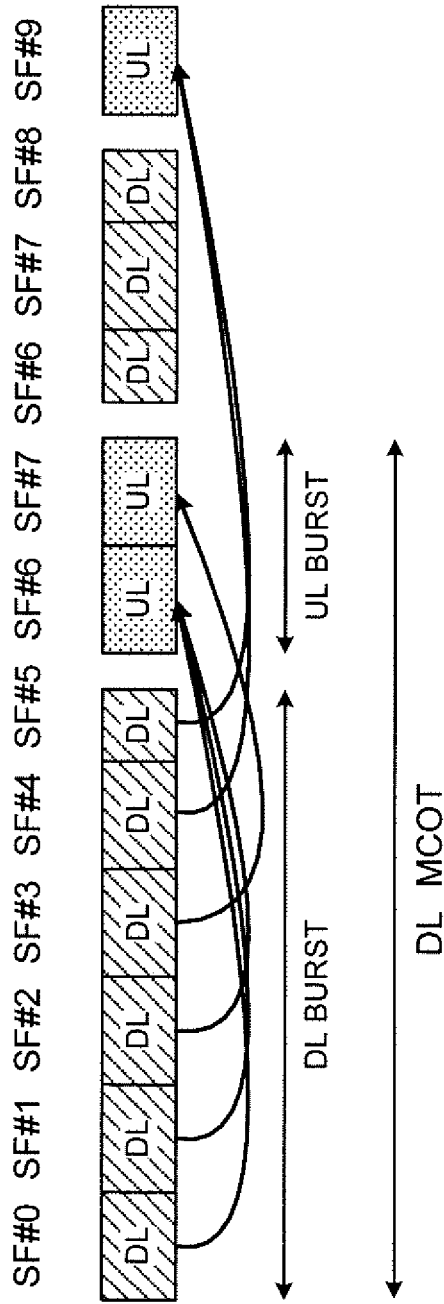
FIG. 11 is a diagram to show another example of A/N transmission according to the present embodiment.

FIG. 11 shows a case where a DL burst period (DL MCOT) is configured over SF #0 to SF #7, and where a DL burst is set forth in SF #0 to SF #5, and a UL burst in SF #6 and SF #7. Obviously, the DL burst period, and/or the number of SFs a DL burst and/or a UL burst occupy are not limited to these examples.

The user terminal receives UL burst information from the downlink control information (for example, shared PDCCH) transmitted in at least one of DL subframes SF #0 to SF #5, included in the DL burst period. For example, the user terminal can transmit HARQ-ACKs in response to SF #0 to SF #2, among DL subframes SF #0 to SF #5 included in the DL burst period, by using SF #6, which is in the UL burst to appear a predetermined period later (here, Y=4). Also, the user terminal can transmit an HARQ-ACK in response to SF #3 by using SF #7, which is in the UL burst to appear the predetermined period later.

In this way, when there are HARQ-ACKs that are left transmitted among HARQ-ACKs in response to DL subframes Y ms or more before, the user terminal can transmit these HARQ-ACKs by using subframes in UL bursts. In this case, the timing for transmitting HARQ-ACKs as feedback in response to DL data in a DL burst needs not determined in advance, but the user terminal can still transmit HARQ-ACKs, in order, in response to DL subframes that have been received Y ms or more before.

By this means, it is not necessary to decide the timing for sending an HARQ-ACK as feedback in response to DL data at the time the DL data is transmitted (DL subframe scheduling). Therefore, it is possible to control the timing for sending HARQ-ACK as feedback flexibly.

Also, in a given DL burst period, HARQ-ACKs in response to each DL subframe are transmitted in a UL burst that appears a predetermined period after these DL subframes, so that HARQ-ACKs in response to some of the DL subframes configured in the DL burst (configured in the first half part, for example) can be sent as feedback at an early timing. Consequently, the latency in feedback of HARQ-ACK s (especially, HARQ-ACKs in response to DL subframes configured in the first half of a DL burst period) can be reduced compared to when HARQ-ACKs are transmitted in response to all the DL subframes contained in a DL burst period. Especially, the effect achieved by the control method of this variation is amplified when a long DL burst period is configured.

Third Example

With a third example of the present invention, the method of configuring uplink control channel formats (PUCCH configurations, PUCCH subframe structures, PUCCH resource configurations), which are used to transmit uplink control information, will be described below. Note that the third example can be applied to the first example and the second example.

The PUCCH configurations to use to transmit uplink control information such as HARQ-ACKs can be defined in the specification in advance, or can be configured in user terminals, semi-statically, by way of higher layer signaling (for example, RRC signaling, etc.). As for the PUCCH configurations, the formats shown in FIG. 5 and FIG. 6 can be used. Note that the PUCCH configurations that can be applied are not limited to these.

When a predetermined PUCCH configuration is defined in advance or configured via higher layer signaling, either a design in which the locations where PUCCH can be allocated (PUCCH locations) are not limited (option 1) or a design in which the locations where PUCCH can be allocated are limited (option 2) may be used, depending on which PUCCH configuration is selected. Alternatively, a design in which PUCCH configurations are reported to and configured in user terminals dynamically by using downlink control information may be used (option 3).

As to what type of LBT (LBT method) is used before PUCCH transmission, the method (method 1) of executing LBT of a predetermined period, which may be defined in advance, and the method (method 2) of reporting a predetermined LBT method, out of a plurality of LBT methods, to a user terminal by using downlink control information may be used. The predetermined period defined in advance may refer to, for example, listening of 25 μs (CCA). A plurality of LBT methods may include, for example, listening of 25 μs, or LBT of category 4 (cat. 4 LBT), which is defined as DL listening, and so forth.

Figure 12A:
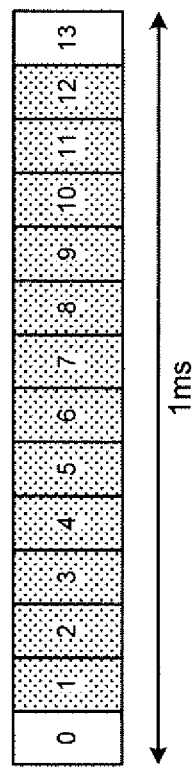
FIGS. 12A and 12B are diagrams to show examples of PUCCH configurations that do not limit the allocation of PUCCH.
Figure 12B:
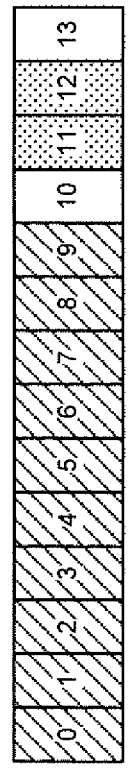
Figure 12B:
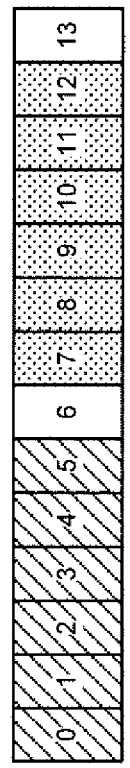

Now, the method of configuring PUCCH configurations will be described below in detail. FIG. 12 show examples of designs in which the locations to allocate PUCCH are not limited (option 1). FIG. 12A shows a case where subframe type A-6 is set forth in advance or configured by higher layer, and FIG. 12B shows a case where subframe type B-2 is set forth in advance or configured by higher layer.

A user terminal transmits PUCCH based on the PUCCH configuration that is configured in advance or the PUCCH configuration reported from the radio base station. The radio base station may designate a predetermined PUCCH configuration (for example, subframe type A-6, B-2 and so on) to the user terminal, or specify the range of PUCCH transmission in the subframe (for example, the location of the starting symbol and/or the ending symbol).

When, in a subframe in which a user terminal transmits PUCCH, PUSCH transmission is scheduled for this user terminal or for another user terminal, the radio base station then exerts control so that the same starting timing applies to the PUSCH transmission and the PUCCH transmission (or the listening before the PUSCH transmission and the listening before the PUCCH transmission). For example, the radio base station includes information related to the timing for starting transmitting the PUCCH in PUSCH-scheduling downlink control information, and reports this to the user terminal.

Referring to FIG. 12A, the radio base station reports, to the user terminal, that the PUCCH configuration is subframe type A-6. Alternatively, the radio base station reports that the starting symbol of the PUCCH is #1 and the ending symbol is #13. The user terminal executes UL LBT in symbol #0 and transmits the PUCCH based on the result of LBT. In this case, depending on the result of LBT, the PUCCH may be transmitted from the middle of symbol #0 (the location to start PUCCH transmission is not limited).

Also, symbol #13 is a blanking symbol where PUCCH transmission does not take place. Note that, if UL transmission (for example, PUSCH transmission) is commanded in the next subframe, the user terminal may execute UL LBT in symbol #13.

As described above, in subframe type A-6, PUCCH is not allocated to the top (in this case, top symbol #0) and the end (here, last symbol #13) of the subframe, and spaces in which LBT can be executed are provided. Therefore, when using subframe type A-6 as a PUCCH configuration, this PUCCH configuration can be configured regardless of the structures of subframes before and after the subframe in which this PUCCH configuration is configured.

Referring now to FIG. 12B, the radio base station reports, to the user terminal, that the PUCCH configuration is subframe type B-2. Alternatively, the base station reports, to the user terminal, that the starting symbol of the PUCCH is the DL symbol duration (6)+W (1) and the ending symbol is #12 (see the left part in FIG. 12B), or that the starting symbol of the PUCCH is DL symbol duration (10)+W(1) and the ending symbol is #12 (see the right part in FIG. 12B). The user terminal executes UL LBT in a period W, which is configured between the DL symbol and the UL symbols, and controls PUCCH transmission based on the result of LBT. Furthermore, in symbol #13, the user terminal does not transmit the PUCCH. Note that, if UL transmission (for example, PUSCH transmission) is commanded in the next subframe, the user terminal may execute UL LBT in symbol #13.

As described above, in subframe type B-2, spaces in which LBT can be performed are provided before PUCCH transmission and at the end of the subframe (here, last symbol #13). Therefore, when subframe type B-2 is used as a PUCCH configuration, this PUCCH configuration can be configured regardless of the structures of subframes before and after the subframe in which this PUCCH configuration is configured.

Figure 13A:
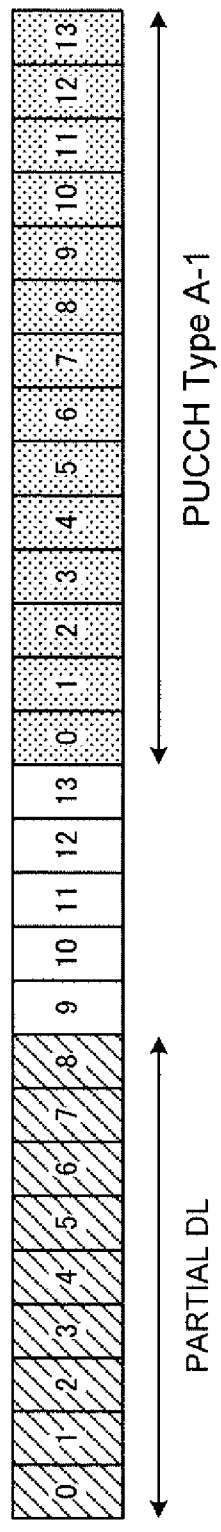
FIGS. 13A and 13B are diagrams to show examples of PUCCH configurations that limit the allocation of PUCCH.
Figure 13B:
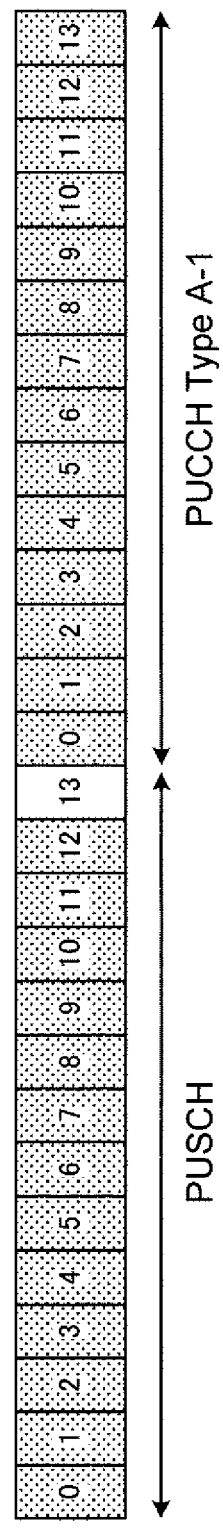

FIG. 13 show examples of designs in which the locations to allocate PUCCH are limited (option 2). FIG. 13 show cases where subframe type A-1 is set forth in advance or configured by higher layer. FIG. 13A shows a case where a partial DL subframe is configured in the subframe before subframe type A-1, and FIG. 13B shows a case where a PUSCH subframe is configured in this subframe before subframe type A-1.

In this case, the user terminal can start transmitting the PUCCH from the top symbol of the PUCCH-transmitting subframe. Meanwhile, if LBT is required before transmitting the PUCCH, the subframe for transmitting the PUCCH (PUCCH configuration) is configured after a subframe in which at least the last symbol is blank (the last symbol is a blanking symbol).

In FIG. 13A, the PUCCH configuration is configured after a partial subframe (partial DL subframe) in which at least the last symbol is blank. In this case, the PUCCH can be made the first UL channel to be transmitted in UL transmission (for example, a UL burst).

In FIG. 13B, the PUCCH configuration is configured after a UL subframe in which at least the last symbol #13 is blank (blanking symbol). The UL subframe can be used, for example, to transmit the PUSCH. In this way, the location of the PUCCH is determined in advance, so that it is possible to transmit the PUCCH by using predetermined PUCCH configurations, without blocking other user terminals by transmitting the PUCCH.

When, in a subframe in which one user terminal transmits PUCCH, PUSCH transmission is scheduled for this user terminal or for another user terminal, the radio base station then exerts control so that the same starting timing applies to the PUSCH transmission and the PUCCH transmission (or the listening before the PUSCH transmission and the listening before the PUCCH transmission). For example, the radio base station includes information related to the timing for starting transmitting the PUCCH in PUSCH-scheduling downlink control information, and reports this to the user terminal.

In the event PUCCH configurations are reported to and configured in user terminals (option 3), bit fields contained in downlink control information can be used. FIG. 14 show examples of tables that are used when reporting PUCCH configurations to user terminals dynamically by using downlink control information and the like. FIG. 14A shows an example of a table that is used to report the timing for starting PUCCH transmission (for example, the starting symbol). As for the timing for starting PUCCH transmission, for example, the starting location specified in subframe type A can be defined in the table. Note that, although FIG. 14A shows a case in which the starting timings in the table are each represented in two bits, this is by no means limiting.

FIG. 14B shows an example of a table that is used to report the timing at which PUCCH transmission ends (for example, the ending symbol). For example, the ending timing specified in subframe type A can be defined in the table as the timing to end PUCCH transmission. Alternatively, when subframe type B is used, the ending timing specified in subframe type B can be defined in the table. Note that, although FIG. 14B shows a case in which the ending timings in the table are each represented in one bit, this is by no means limiting.

FIG. 14C shows an example of a table that is used to report predetermined PUCCH configurations (subframe type A and/or subframe type B). For example, a number of subframe types corresponding to respective bit values are configured in a user terminal in advance using high layer signaling and the like, and then one subframe type may be reported to the user terminal by using downlink control information.

The PUCCH configuration-specifying information set forth in the table of FIGS. 14A to 14C can be configured in a predetermined bit field (for example, a new bit field) in downlink control information.

<PUCCH/PUSCH Simultaneous Transmission>

The method for allowing a user terminal to use an uplink control channel when the timing for transmitting uplink control information and the timing for transmitting uplink data by using an uplink shared channel are the same will be described below.

For example, when, in a subframe in which a PUSCH is scheduled, a user terminal is commanded to transmit uplink control information using a PUCCH in an LAA SCell (UCI on PUCCH), the user terminal can operate in one of following operations 1 to 3:

(Operation 1)

When PUCCH/PUSCH simultaneous transmission is configured in the user terminal, the user terminal transmits the PUCCH and the PUSCH simultaneously. That is, the user terminal transmits uplink control information by using the PUCCH, and transmit uplink data by using the PUSCH. In this case, the same listening (UL LBT) operation can be applied to the PUCCH transmission and the PUSCH transmission.

In addition, if there are an LBT method designated (or configured in advance) for PUCCH transmission and an LBT method designated (or configured in advance) for PUSCH transmission, the user terminal can select and use one of the LBT methods. In the event the LBT method is specified (or configured in advance) only for one of PUCCH transmission and PUSCH transmission, the user terminal may transmit each channel using this LBT method.

In addition, the user terminal can use the transmission starting and/or ending timings, specified for each channel. At this time, it is preferable to make the starting timing of each channel the same.

If PUCCH/PUSCH simultaneous transmission is not configured in the user terminal, the user terminal can transmit uplink control information using the PUSCH. In this case, the user terminal may use the LBT method designated (or configured in advance) for PUCCH transmission. In this way, when uplink control information, which is more important than uplink data, is transmitted in the PUSCH, the user terminal can moderate the conditions for UL LBT and control transmission accordingly. Alternatively, the user terminal may use the LBT method designated (or configured in advance) for PUSCH transmission.

In addition, the user terminal can use any of the transmission starting and/or ending timings specified for each channel. For example, the user terminal may control the timing for starting transmitting uplink control information using the PUSCH based on the starting timing configured for PUCCH transmission, and control the timing for finishing transmitting uplink control information using the PUSCH based on the ending timing configured for PUSCH transmission.

(Operation 2)

The user terminal may always transmit the PUCCH and the PUSCH simultaneously regardless of whether PUCCH/PUSCH simultaneous transmission is configured or not. By this means, uplink control information can always be transmitted in the PUCCH without special configuration.

(Operation 3)

Regardless of whether or not PUCCH/PUSCH simultaneous transmission is configured, the user terminal may always transmit uplink control information by using the PUSCH. This eliminates the need to support the case of PUCCH/PUSCH simultaneous transmission.

<Interlaced Transmission>

Interlaced configuration can also be applied to PUCCH resource allocation. Interlaced configuration refers to the kind of design (multi-cluster allocation) that uses a plurality of clusters, uniformly distributed in the frequency direction in the system band, as units of transmission, and allocates these transmission units to user terminals. In multi-cluster allocation, the maximum number of clusters that can be allocated to one user terminal is not limited to two, like the uplink resource allocation scheme for licensed bands. This multi-cluster allocation is also referred to as "interlaced multi-cluster allocation," "interlaced multi-cluster transmission," and the like.

Every cluster that constitutes one interlace can be constituted by one or more consecutive frequency units (for example, resource blocks, subcarriers, and so on). For example, if the system band is 20 MHz (100 resource blocks), interlace # i can be constituted by ten resource blocks (cluster) of index values $\{i, i+10, i+20, \ldots, i+90\}$.

When the uplink system band is 20 MHz (100 resource blocks), ten interlaces #0 to #9 can be configured. For example, interlaces #0 and #6 are allocated to user terminal #1. That is, twenty clusters that constitute interlace #0 and #6 can be allocated to user terminal #1.

In this way, when interlaced configuration is applied to allocation of PUCCH resources, interlace indices, which specify interlaces that are applied, are reported to user terminals. Also, in addition to interlace indices, the radio base station may report CDM indices as well (cyclic shift indices and/or OCC indices, and so on). For example, interlace indices and CDM indices can be configured in a user terminal via higher layer signaling.

Alternatively, multiple interlace indices and CDM indices (report set 1 to 4), corresponding to respective bit values (for example, two bits), can be configured in a user terminal in advance by using higher layer signaling and so on. Then, by using downlink control information including predetermined bits, one combination of an interlace index and a CDM index may be specified to the user terminal on a dynamic basis (see FIG. 15).

The bits that are set forth in the table of FIG. 15 can be configured in a predetermined bit field (for example, a new bit field and/or an existing bit field) in downlink control information. As an existing bit field, for example, the DAI bit field can be used. By this means, it is possible to prevent the overhead related to downlink control information from increasing.

Also, the radio base station may report, to the user terminal, the same content (for example, the same interlace index and/or CDM index) in a number of pieces of downlink control information that command feedback in the same UL subframe.

(Radio Communication System)

Now, the structure of a radio communication system according to the present embodiment will be described below. In this radio communication system, the radio communication methods according to the above-described embodiments are employed. Note that the radio communication method according to each embodiment described above may be used alone or may be used in combination.

Figure 16:
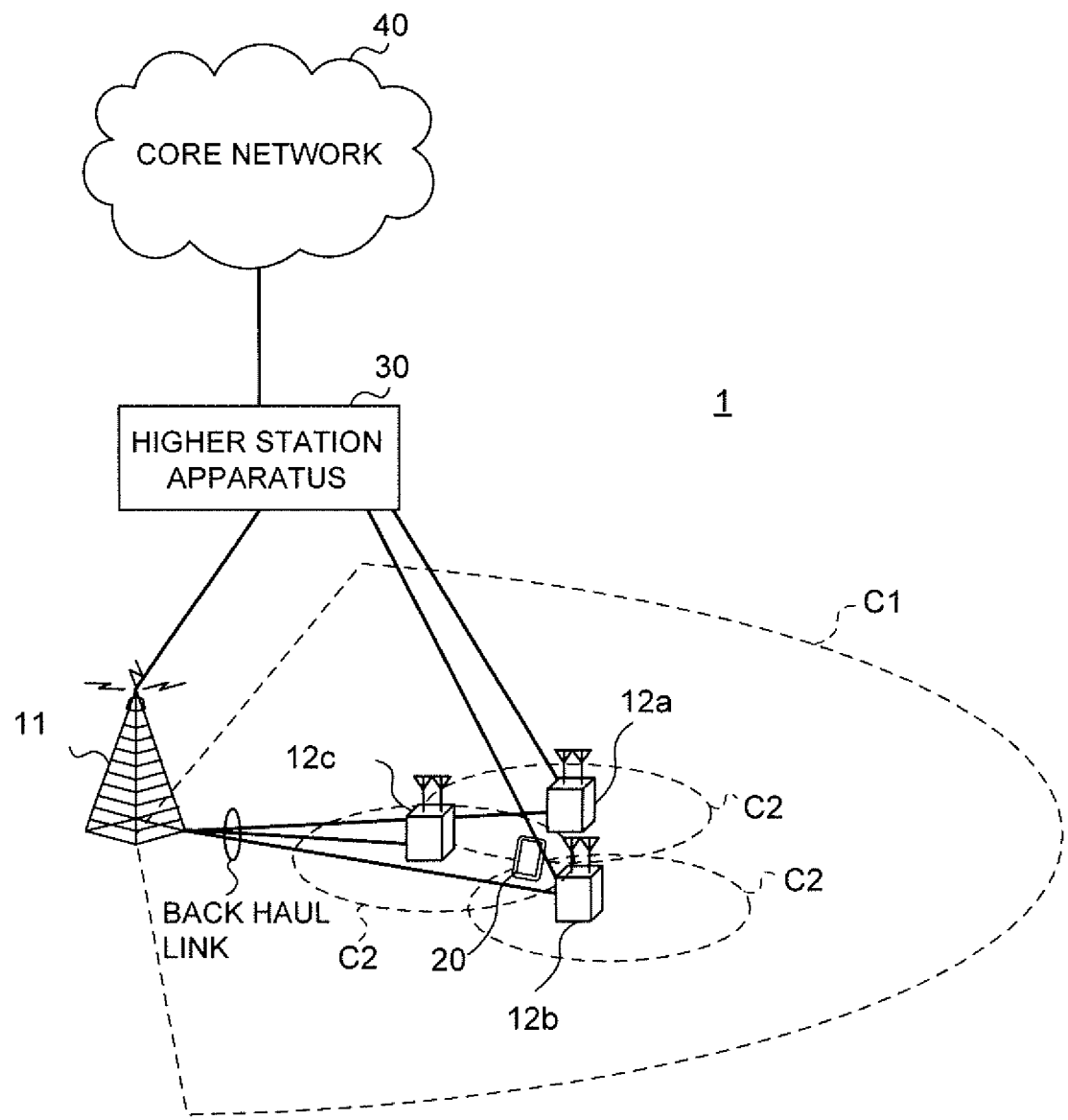
FIG. 16 is a diagram to show an example of a schematic structure of a radio communication system according to the present embodiment.

FIG. 16 is a diagram to show an exemplary schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 16 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A configuration in which different numerologies are applied between cells may be adopted here. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells. Note that a configuration may be employed here in which TDD carriers to use shortened TTIs are included in some of these cells.

Between user terminals 20 and the radio base station 11, communication can be carried out using a carrier of a relatively low frequency band (for example, 2 GHz) and a narrow bandwidth (referred to as, for example, an "existing carrier," a "legacy carrier," and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that frequency bands that are used in each radio base station are by no means limited to these structures.

A configuration may be employed here, in which the radio base station 11 and the radio base station 12 (or two radio base stations 12) are connected by cables (for example, by optical fiber in compliance with CPRI (Common Public Radio Interface), the X2 interface and so on), or connected by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL.

In the radio communication system 1, a DL data channel (PDSCH (Physical Downlink Shared CHannel), which is also referred to as, for example, a "DL shared channel"), which is shared by each user terminal 20, a broadcast channel (PBCH (Physical Broadcast CHannel)), L1/L2 control channels and so on are used as DL channels. User data, higher layer control information, SIBs (System Information Blocks) and so on are communicated in the PDSCH. Also, the MIB (Master Information Block) is communicated in the PBCH.

The L1/L2 control channels include DL control channels (PDCCH (Physical Downlink Control CHannel), EPDCCH (Enhanced Physical Downlink Control CHannel), and/or other channels), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement information (ACK/NACK) in response to the PUSCH is communicated by the PHICH. The EPDCCH is frequency-division-multiplexed with the PDSCH (downlink shared data channel) and used to communicate DCI and so on, like the PDCCH.

In the radio communication system 1, a UL data channel (PUSCH (Physical Uplink Shared CHannel), which is also referred to as "UL shared channel" and so on), which is shared by each user terminal 20, a UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of delivery acknowledgment information (ACK/NACK), radio quality information (CQI) and so on, is transmitted by the PUSCH or the PUCCH. By means of the PRACH, random access preambles for establishing connections with cells are communicated.

(Radio Base Station)

Figure 17:
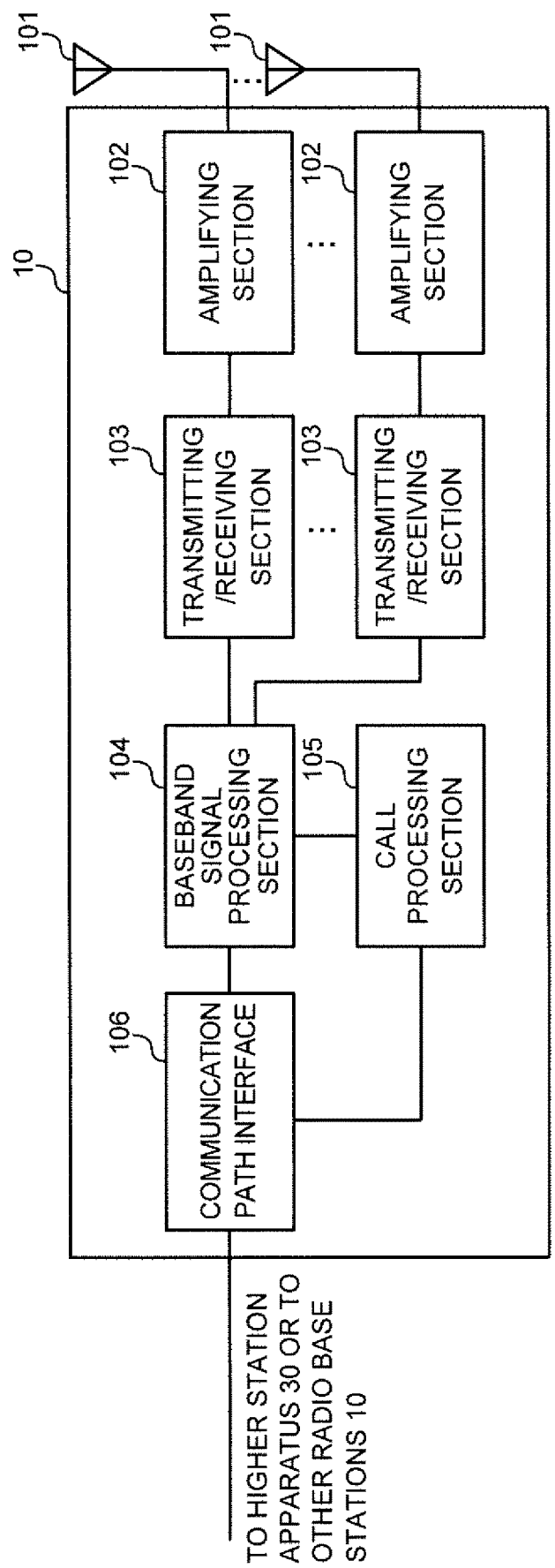
FIG. 17 is a diagram to show an example of a functional structure of a radio base station according to the present embodiment.

FIG. 17 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

DL data to be transmitted from the radio base station 10 to a user terminal 20 is input from the higher station apparatus 30 to the baseband signal processing section 104, via the communication path interface 106.

In the baseband signal processing section 104, the DL data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to the transmitting/receiving sections 103. Furthermore, DL control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals (for example, DL control signals (DL control channels), DL data signals (DL data channels, DL shared channels and so on), DL reference signals (DM-RS, CSI-RS and so on), discovery signals, synchronization signals, broadcast signals and so on), and receive UL signals (for example, UL control signals (UL control channels), UL data signals (UL data channels, UL shared channels and so on), UL reference signals and so on).

To be more specific, transmitting/receiving sections 103 transmits information (offset) related to the timing for transmitting HARQ-ACK feedback in response to DL transmission, as well as other types of information related to DL burst length, UL burst length, DL burst index, PUCCH configuration and so forth, to user terminals 20. The transmitting/receiving sections 103 receive uplink control information such as HARQ-ACKs transmitted from the user terminals 20.

The transmitting/receiving sections of the present invention are constituted by a transmitting/receiving section 103 and/or a communication path interface 106.

Figure 18:
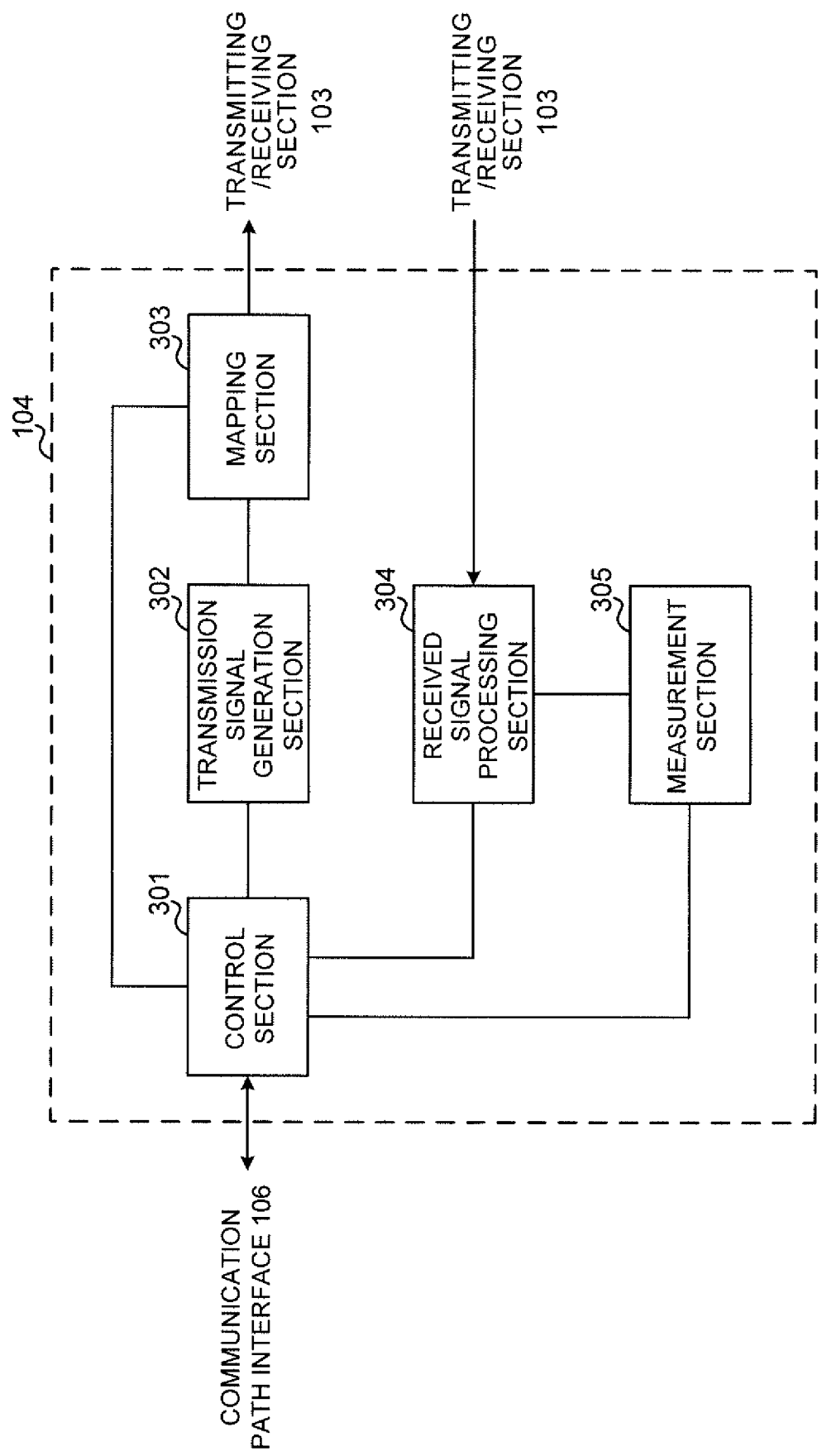
FIG. 18 is a diagram to show an exemplary functional structure of a baseband signal processing section provided in a radio base station.

FIG. 18 is a diagram to show an exemplary functional structure of a radio base station according to the present embodiment. Note that, although FIG. 18 primarily shows functional blocks that pertain to characteristic parts of the present embodiment, the radio base station 10 has other functional blocks that are necessary for radio communication as well. As shown in FIG. 18, the baseband signal processing section 104 at least has a control section 301, a transmission signal generation section 302, a mapping section 303, a received signal processing section 304 and a measurement section 305.

The control section 301 controls the whole of the radio base station 10. The control section 301 can be constituted by a controller, a control circuit or control apparatus that can be described based on general understanding of the technical field to which the present invention pertains.

The control section 301, for example, controls generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls scheduling (for example, resource allocation) of DL signals and/or UL signals. To be more specific, the control section 301 controls the transmission signal generation section 302, the mapping section 303 and the transmitting/receiving sections 103 to generate and transmit DCI (DL assignments, DL grants, etc.) that includes DL data channel scheduling information, and DCI (UL grants) that includes UL data channel scheduling information.

In addition, the control section 301 can dynamically control the timing for transmitting HARQ-ACK feedback in response to DL transmission.

The transmission signal generation section 302 generates DL signals (DL control channels, DL data channels, DL reference signals such as DM-RSs, and so on) as commanded from the control section 301, and outputs the DL signals to the mapping section 303. The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources, as commanded from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) for received signals that are input from the transmitting/receiving sections 103. Here, the received signals are, for example, UL signals transmitted from the user terminal 20 (UL control channels, UL data channels, UL reference signals and so on). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, the received signal processing section 304 outputs at least one of a preamble, control information and UL data, to the control section 301. Also, the received signal processing section 304 outputs the received signals, the signals after the receiving processes and so on, to the measurement section 305.

The measurement section 305 conducts measurements with respect to the received signal. The measurement section 305 can be constituted by a measurer, a measurement circuit or measurement apparatus that can be described based on general understanding of the technical field to which the present invention pertains.

The measurement section 305 may measure the received signals' received power (for example, RSRP (Reference Signal Received Power)), received quality (for example, RSRQ (Reference Signal Received Quality)), channel states and so on. The measurement results may be output to the control section 301.

(User Terminal)

Figure 19:
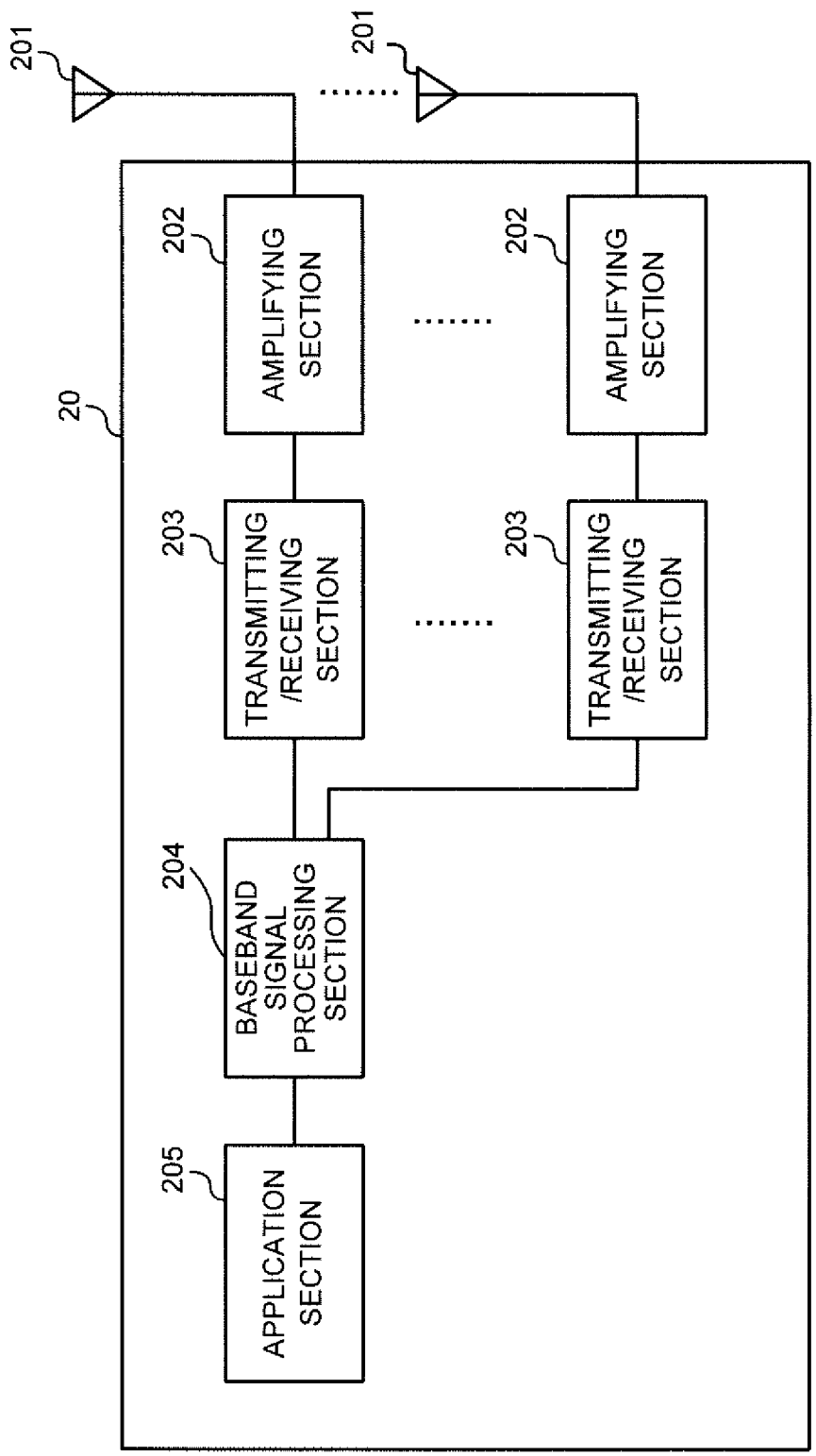
FIG. 19 is a diagram to show an example of a functional structure of a user terminal according to the present embodiment.

FIG. 19 is a diagram to show an exemplary overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process and so on. The DL data is forwarded to the application section 205. The application section 205 performs processes related to higher layers above the physical layer and the MAC layer and so on. Also, in the DL data, system information and higher layer control information are also forwarded to the application section 205.

Meanwhile, UL data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive DL signals (for example, DL control signals (DL control channels), DL data signals (DL data channels, DL shared channels and so on), DL reference signals (DM-RS, CSI-RS and so on), discovery signals, synchronization signals, broadcast signals and so on), and transmit UL signals (for example, UL control signals (UL control channels), UL data signals (UL data channels, UL shared channels and so on), UL reference signals and so on).

To be more specific, the transmitting/receiving sections 203 receive downlink control information (for example, UL grants, DL grants, etc.), and, furthermore, transmit uplink control information such as HARQ-ACK, uplink data and so forth. For example, the transmitting/receiving sections 203 receive information (offset) related to the timing for transmitting HARQ-ACK feedback in response to DL transmission, as well as other types of information related to DL burst length, UL burst length, DL burst index, PUCCH configuration and so forth.

Figure 20:
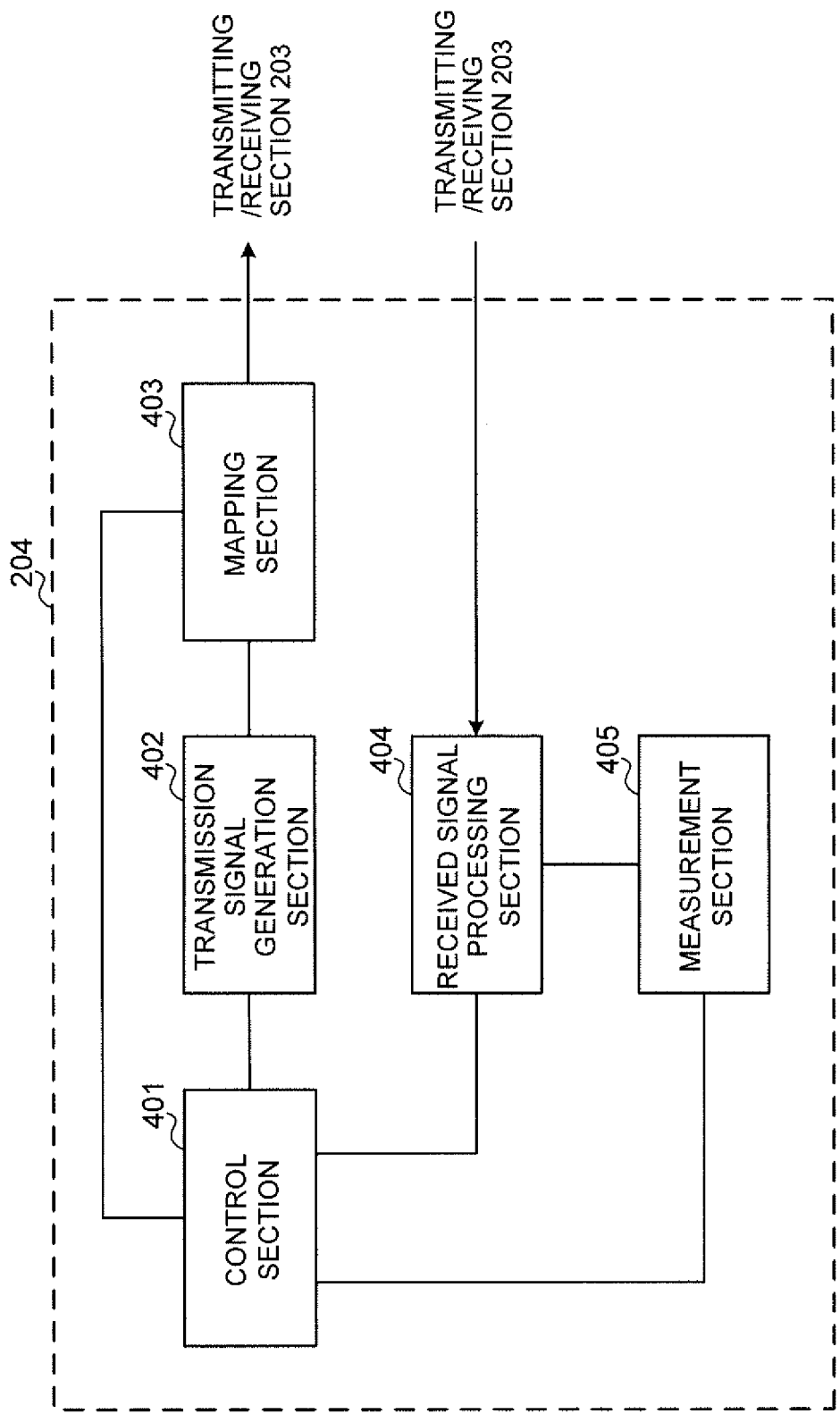
FIG. 20 is a diagram to show an exemplary functional structure of a baseband signal processing section provided in a user terminal.

FIG. 20 is a diagram to show an exemplary functional structure of a user terminal according to the present embodiment. Note that, although FIG. 20 primarily shows functional blocks that pertain to characteristic parts of the present embodiment, the user terminal 20 has other functional blocks that are necessary for radio communication as well. As shown in FIG. 20, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 controls UL transmission based on results of UL listening, which is executed before UL transmission. In addition, the control section 401 controls transmission of HARQ-ACKs based on information (for example, timing information (offset), and other types of information related to DL burst, UL burst and so forth) included in downlink control information, and/or timings that are configured in advance on a per DL burst basis (see FIG. 3, FIG. 4, FIG. 8 and FIG. 11).

In addition, the control section 401 exerts control so that HARQ-ACKs are transmitted in a subframe having a predetermined uplink control channel format that is configured in advance out of multiple uplink control channel formats (PUCCH configurations) (see FIG. 12 and FIG. 13). In addition, the control section 401 controls the codebook size to apply to the transmission of HARQ-ACKs based on the feedback window size configured in the subframe in which the HARQ-ACKs are transmitted, and/or downlink assignment indices (DAIs) contained in downlink control information (see FIG. 7). In addition, the control section 401 controls the feedback window size and/or the codebook size applied to the transmission of HARQ-ACKs, on a per DL burst basis.

Furthermore, the control section 401 exerts control so that, when downlink control information that is transmitted in a DL burst period contains information related to a UL burst (UL burst configuration information), at least a part of which is configured in the DL burst period, HARQ-ACKs in response to downlink data that has been transmitted a predetermined period (for example, Y) before the UL burst, in the DL burst period, are transmitted by using the UL burst (see FIG. 11).

The transmission signal generation section 402 generates UL signals (UL control channels, UL data signals, UL reference signals and so on) as commanded from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

Also, the transmission signal generation section 402 generates UL data channels as commanded by the control section 401. For example, when a UL grant is included in a DL control channel that is reported from the radio base station 10, the control section 401 commands the transmission signal generation section 402 to generate a UL data channel.

The mapping section 403 maps the UL signals generated in the transmission signal generation section 402 to radio resources as commanded from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) for received signals that are input from the transmitting/receiving sections 203. Here, the received signals include, for example, DL signals transmitted from the radio base station 10 (DL control channels, DL data channels, DL reference signals and so on). The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from control section 401, the received signal processing section 404 performs blind decoding of a DL control channel, which schedules transmission and/or receipt of a DL data channel, and performs receiving processes for the DL data channel based on this DCI. In addition, the received signal processing section 404 estimates channel gain based on the DM-RS or the CRS, and demodulates the DL data channel based on the estimated channel gain.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received signals' received power (for example, RSRP), DL received quality (for example, RSRQ) and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 21:
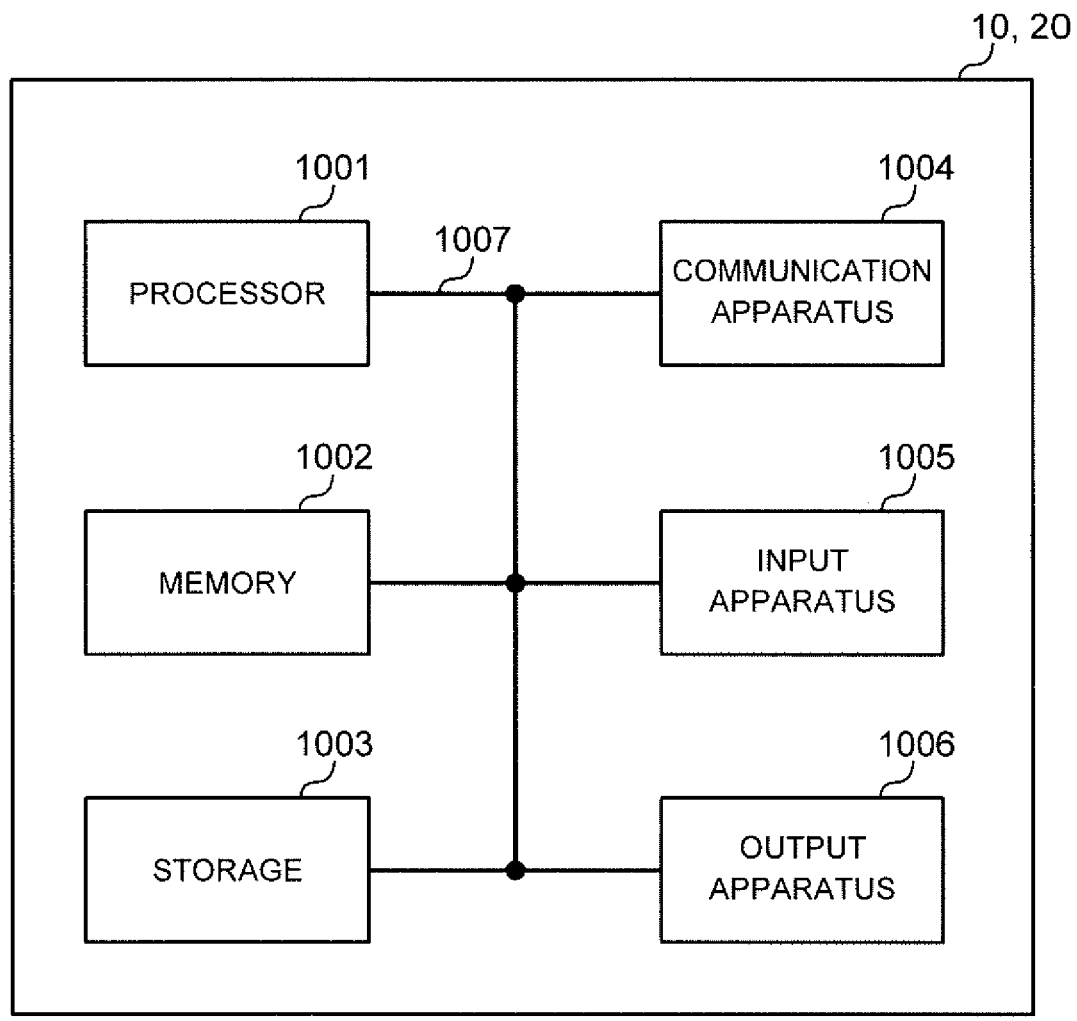
FIG. 21 is a diagram to show an exemplary hardware structure of a radio base station and a user terminal according to one embodiment of the present invention.

For example, the radio base station, user terminals and so on according to an embodiment of the present invention may function as a computer that executes the processes of the radio communication method of the present invention. FIG. 21 is a diagram to show an exemplary hardware structure of a radio base station and a user terminal according to an embodiment of the present invention. Physically, the above-described radio base stations 10 and user terminals 20 may be formed as computer apparatus that includes a processor 1001, a memory 1002, a storage 1003, communication apparatus 1004, input apparatus 1005, output apparatus 1006, a bus 1007 and so on.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and user terminal 20 is implemented by allowing predetermined software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules radio resources (such as the frequency bandwidth and transmission power that can be used in each user terminal) to allocate to each user terminal in TTI units. Note that the definition of TTIs is by no means limited to this. TTIs may be the time unit for transmitting channel-encoded data packets (transport blocks), or may be the unit of processing in scheduling, link adaptation and so on.

A TTI having a time duration of 1 ms may be referred to as a "normal TTI (TTI in LTE Rel. 8 to 12)", a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the above-described structures of radio frames, subframes, slots, symbols and so on are simply examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other applicable formats of information. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (master information block (MIB), system information blocks (SIBS) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a structure in which communication between a radio base station and a user terminal is replaced with communication among a plurality of user terminals (D2D (Device-to-Device)). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-176857, filed on Sep. 9, 2016, including the specification, drawings and abstract, is incorporated herein by reference in its entirety.

The invention claimed is:

1. A terminal comprising:
a receiver that receives downlink control information for scheduling a downlink shared channel; and
a processor that controls transmission of a delivery acknowledgment signal, in response to the downlink shared channel,
wherein the delivery acknowledgment signal is transmitted using an uplink control channel,
the processor determines a slot for the transmission of the delivery acknowledgement signal based on a field for a feedback timing indication contained in the downlink control information, and
a number of bits of a field for the feedback timing indication is variable based on higher layer signaling,
wherein the processor determines a size of the delivery acknowledgment signal based on a number of transport blocks (TBs) and a downlink assignment index (DAI) that is contained in the downlink control information, in DL transmission units that use the same uplink control channel.

2. The terminal according to claim 1, wherein the processor determines an uplink control channel resource configuration from among a plurality of uplink control channel resource configurations configured via higher layer signaling, based on information related to the uplink control channel that is contained in the downlink control information, and controls the transmission of the delivery acknowledgment signal using the determined uplink control channel resource configuration.

3. A radio communication method, the method comprising:
receiving downlink control information for scheduling a downlink shared channel; and
controlling transmission of a delivery acknowledgment signal, in response to the downlink shared channel,
wherein a size of the delivery acknowledgment signal is determined based on a number of transport blocks (TBs) and a downlink assignment index (DAI) that is contained in the downlink control information, in DL transmission units that use the same uplink control channel,
the delivery acknowledgment signal is transmitted using an uplink control channel,
a slot for the transmission of the delivery acknowledgement signal is determined based on a field for a feedback timing indication contained in the downlink control information, and
a number of bits of a field for the feedback timing indication is variable based on higher layer signaling.

4. A base station comprising:
a transmitter that transmits downlink control information for scheduling a downlink shared channel; and
a processor that controls receipt of a delivery acknowledgment signal, in response to the downlink shared channel, in a slot determined based on a field for a feedback timing indication that is contained in the downlink control information,
wherein the delivery acknowledgment signal is received using an uplink control channel,
wherein a number of bits of a field for the feedback timing indication is variable based on higher layer signaling, and
wherein a size of the delivery acknowledgment signal is determined based on a number of transport blocks (TBs) and a downlink assignment index (DAI) that is contained in the downlink control information, in DL transmission units that use the same uplink control channel.

5. A system comprising:
a terminal that comprises:
  a receiver that receives downlink control information for scheduling a downlink shared channel; and
  a processor of the terminal that controls transmission of a delivery acknowledgment signal, in response to the downlink shared channel,
  wherein the delivery acknowledgment signal is transmitted using an uplink control channel;
  the processor of the terminal determines a slot for the transmission of the delivery acknowledgment signal based on a field for a feedback timing indication contained in the downlink control information,
  a number of bits of a field for the feedback timing indication is variable based on higher layer signaling,
  wherein the processor of the terminal determines a size of the delivery acknowledgment signal based on a number of transport blocks (TBs) and a downlink assignment index (DAI) that is contained in the downlink control information, in DL transmission units that use the same uplink control channel; and
a base station that comprises:
  a transmitter that transmits the downlink control information; and
  a processor of the base station that controls receipt of the delivery acknowledgment signal.

* * * * *